(12) United States Patent
Vesely

(10) Patent No.: US 8,643,569 B2
(45) Date of Patent: Feb. 4, 2014

(54) TOOLS FOR USE WITHIN A THREE DIMENSIONAL SCENE

(75) Inventor: Michael A. Vesely, Santa Cruz, CA (US)

(73) Assignee: zSpace, Inc., Sunnyvale, CA (US)

( * ) Notice: Subject to any disclaimer, the term of this patent is extended or adjusted under 35 U.S.C. 154(b) by 265 days.

(21) Appl. No.: 13/182,305

(22) Filed: Jul. 13, 2011

(65) Prior Publication Data

US 2012/0013613 A1 Jan. 19, 2012

Related U.S. Application Data

(60) Provisional application No. 61/364,277, filed on Jul. 14, 2010.

(51) Int. Cl.
*G06T 15/00* (2011.01)
(52) U.S. Cl.
USPC ............... 345/8; 345/7; 345/156; 345/157; 345/158; 345/180; 345/181; 345/182; 345/183; 345/184; 345/419; 715/836
(58) Field of Classification Search
USPC ......... 345/7, 8, 156–158, 180–184, 419–420; 715/836
See application file for complete search history.

(56) References Cited

U.S. PATENT DOCUMENTS

| | | | |
|---|---|---|---|
| 5,175,616 A * | 12/1992 | Milgram et al. | 348/47 |
| 5,574,836 A | 11/1996 | Broemmelsiek | |
| 5,914,717 A | 6/1999 | Kleewein et al. | |
| 6,031,519 A | 2/2000 | O'Brien | |
| 6,064,354 A | 5/2000 | DeLuca | |
| 6,115,025 A | 9/2000 | Buxton et al. | |
| 6,388,639 B1 * | 5/2002 | Hoshino et al. | 345/8 |
| 6,727,924 B1 | 4/2004 | Anderson | |
| 6,753,847 B2 | 6/2004 | Kurtenbach et al. | |
| 6,842,175 B1 | 1/2005 | Schmalstieg et al. | |
| 7,043,695 B2 | 5/2006 | Elber et al. | |
| 7,447,999 B1 | 11/2008 | Robertson et al. | |
| 7,526,384 B2 | 4/2009 | MacIntosh et al. | |
| 7,557,816 B2 | 7/2009 | Kuroki | |
| 7,731,495 B2 | 6/2010 | Eisenberg et al. | |
| 7,739,623 B2 | 6/2010 | Liang et al. | |
| 7,750,911 B2 | 7/2010 | Bae | |
| 7,774,695 B2 | 8/2010 | Kobylinski | |

(Continued)

OTHER PUBLICATIONS

Doug A. Bowman, Ernst Kruijff, Joseph J. LaViola, Jr., Ivan Poupyrev, "An Introduction to 3-D User Interface Design," PRESENSE: vol. 10, No. 1, Feb. 2001, pp. 96-108.

(Continued)

*Primary Examiner* — Xiao M. Wu
*Assistant Examiner* — Todd Buttram
(74) *Attorney, Agent, or Firm* — Meyertons Hood Kivlin Kowert & Goetzel, P.C.; Jeffrey C. Hood; Joel L. Stevens

(57) ABSTRACT

Tools for use within a 3D scene. The 3D scene may be presented by at least one display, which includes displaying at least one stereoscopic image of the 3D scene by the display(s). The 3D scene may be presented according to a first viewpoint. User input may be received to the 3D scene using one or more tools. The 3D scene may be updated in response to the use of the one or more tools.

24 Claims, 22 Drawing Sheets

(56) References Cited

U.S. PATENT DOCUMENTS

| | | | |
|---|---|---|---|
| 7,830,377 | B1 | 11/2010 | Desimone et al. |
| 7,881,901 | B2 | 2/2011 | Fein et al. |
| 7,907,167 | B2 | 3/2011 | Vesely et al. |
| 7,913,185 | B1 | 3/2011 | Benson et al. |
| 8,384,665 | B1* | 2/2013 | Powers et al. .......... 345/156 |
| 2002/0186348 | A1 | 12/2002 | Covannon et al. |
| 2004/0001111 | A1 | 1/2004 | Fitzmaurice et al. |
| 2005/0062684 | A1* | 3/2005 | Geng .......... 345/32 |
| 2006/0051073 | A1 | 3/2006 | Jung et al. |
| 2007/0057944 | A1 | 3/2007 | Redert |
| 2007/0152131 | A1* | 7/2007 | Pihlaja .......... 250/205 |
| 2008/0030461 | A1* | 2/2008 | Matsui et al. .......... 345/156 |
| 2009/0091708 | A1* | 4/2009 | Greene .......... 353/7 |
| 2009/0267895 | A1* | 10/2009 | Bunch .......... 345/157 |
| 2011/0010666 | A1 | 1/2011 | Choi |
| 2011/0029907 | A1 | 2/2011 | Bakhash |
| 2011/0164029 | A1 | 7/2011 | King et al. |

OTHER PUBLICATIONS

Steven Schkolne, "Drawing with the Hand in Free Space: Creating Organic 3d Shapes with Gesture in a Semi-Immersive Environment," Leonardo, Aug. 2002, 6 pages.

Dustin Lang, Leah Findlater, Michael Shaver, "CoolPaint: Direct Interaction Painting," Proceedings of the 16th Annual ACM Symposium on User Interface Software and Technology (UIST), 2003, 2 pages.

SolidWorks Tech Tips- Sketching, http://capinc.com/support/tips/solidworks-tech-tips-sketching, 5 pages. (Retrieved Aug. 4, 2011).

Bernd Frohlich, et al., "Physically-Based Manipulation on the Responsive Workbench," Virtual Reality, 2000, 7 pages.

Bernd Frohlich, et al., "The Responsive Workbench: A Virtual Working Environment for Physicians," Computers in Biology and Medicine, vol. 25, No. 2, Mar. 1995, pp. 301-308.

Ken Hinckley, et al., "A Survey of Design Issues in Spatial Input," Proceedings of ACM UIST Symposium on User Interface Software & Technology, 1994, pp. 213-222.

James H. Clark, "Graphics and Image Processing: Designing Surfaces in 3-D," Communications of the ACM, vol. 19, No. 8, Aug. 1976, pp. 454-460.

Lawrence D. Cutler, et al., "Two-Handed Direct Manipulation on the Responsive Workbench," Proceedings of the 1997 symposium on Interactive 3D graphics, 1997, 9 pages.

Luis Serra, et al., "Interaction Techniques for a Virtual Workspace," Proceedings in ICAT/VRST'95—ACM Virtual Reality Software and Technology, 1995, 11 pages.

Chris Shaw, Mark Green, "Two-Handed Polygonal Surface Design," ACM symposium on User interface software and technology (UIST), Nov. 2-4, 1994, pp. 205-212.

Huh, Kyung-Moo, et al., "A Viewpoint-Dependent Autostereoscopic 3D Display Method", ISIE 2001, Pusan, Korea, © Jun. 2001 IEEE, pp. 95-100.

Das, Kaushik, et al., "An Evaluation of Menu Properties and Point Techniques in a Projection-based VR Environment", IEEE Symposium on 3D User Interfaces 2010, Waltham, Massachusetts, Mar. 20-21, 2010, pp. 47-50.

Kim, Namgyu, et al., "Multimodal Menu Presentation and Selection in Immersive Virtual Environments", POSTECH, Korea, Feb. 11, 2005, pp. 1-8.

* cited by examiner

TOOLS FOR USE WITHIN A THREE DIMENSIONAL SCENE

PRIORITY DATA

This application claims benefit of priority of U.S. provisional application Ser. No. 61/364,277, titled "Tools for use within a Three Dimensional Scene", filed Jul. 14, 2010, whose inventors are Michael A. Vesely, Michael C. Albers, Alan S. Gray, Scott Harris, Steven C. Hess, Baifang Lu, Edward M. Sesek, Peter F. Ulmann, and Craig Upson, which is hereby incorporated by reference in its entirety as though fully and completely set forth herein.

FIELD OF THE INVENTION

The present invention relates to the field of three dimensional graphics, and more particularly to improved tools and user interface elements for use within a three dimensional scene.

DESCRIPTION OF THE RELATED ART

Three dimensional (3D) capable computing devices and real-time computer-generated 3D computer graphics have been a popular area of computer science for the past few decades, with innovations in visual, audio and tactile systems. Much of the research in this area has produced hardware and software products that are specifically designed to generate greater realism and more natural computer-human interfaces. These innovations have significantly enhanced and simplified the user's computing experience.

However, additional tools and improvements to the realm of 3D systems are desired.

SUMMARY OF THE INVENTION

Various embodiments are presented of a system and method for improved user tools and interface elements for use within a three dimensional scene.

A 3D scene may be presented by at least one display. More particularly, one or more stereoscopic images of the 3D scene may be presented by the display(s), e.g., by one or more stereoscopic displays. The 3D scene may be presented according to a first viewpoint. For example, the first viewpoint may be based on an eyepoint of a user viewing the 3D scene. In one embodiment, the method may include determining the first viewpoint, e.g., by determining the eyepoint of the user viewing the 3D scene. The method may determine the eyepoint of the user using various techniques, such as a position input device (e.g., glasses which provide eyepoint position information), triangulation, head/eye tracking, etc. Accordingly, the 3D scene may be rendered such that user can view the 3D scene with minimal distortions (e.g., since it is based on the eyepoint of the user).

As indicated above, the 3D scene may be presented by a single display or a plurality of displays. In one embodiment, the 3D scene may be presented by a vertical display and a horizontal display. For example, the vertical display may present a first stereoscopic image, e.g., according to a vertical perspective, and the horizontal display may present a second stereoscopic image, e.g., according to a horizontal perspective. These two stereoscopic images may form the 3D scene. In further embodiments, the two displays may be joined by a curvilinear or blending display, which may also present a stereoscopic image. The stereoscopic image of the blending display may operate to blend the stereoscopic images of the vertical and horizontal displays. Other numbers and types of displays are contemplated for presenting the 3D scene.

At least a portion of the 3D scene may be presented in "open space" in front of or otherwise outside of the at least one display. Thus, as indicated above, at least a portion of the 3D scene may appear as a hologram above the surface of the display. Thus, the user can directly interact with objects (displayed virtual objects) in the open space because they co-inhabit physical space proximate to the user. The inner volume is located behind the viewing surface, and portions of the 3D scene within this inner volume appear "inside" the physical viewing device. Thus, objects of the 3D scene presented within the inner volume do not share the same physical space with the user, and the objects therefore cannot be directly manipulated by hands or hand-held tools. That is, objects displayed within the inner volume may be manipulated indirectly, e.g., via a computer mouse or a joystick.

The method may further include receiving user input using one or more tools or user interface elements described herein.

The 3D scene may be updated based on the user input using the one or more tools or user interface elements described herein.

BRIEF DESCRIPTION OF THE DRAWINGS

A better understanding of the present invention can be obtained when the following detailed description of the preferred embodiment is considered in conjunction with the following drawings, in which.

Figure 1:
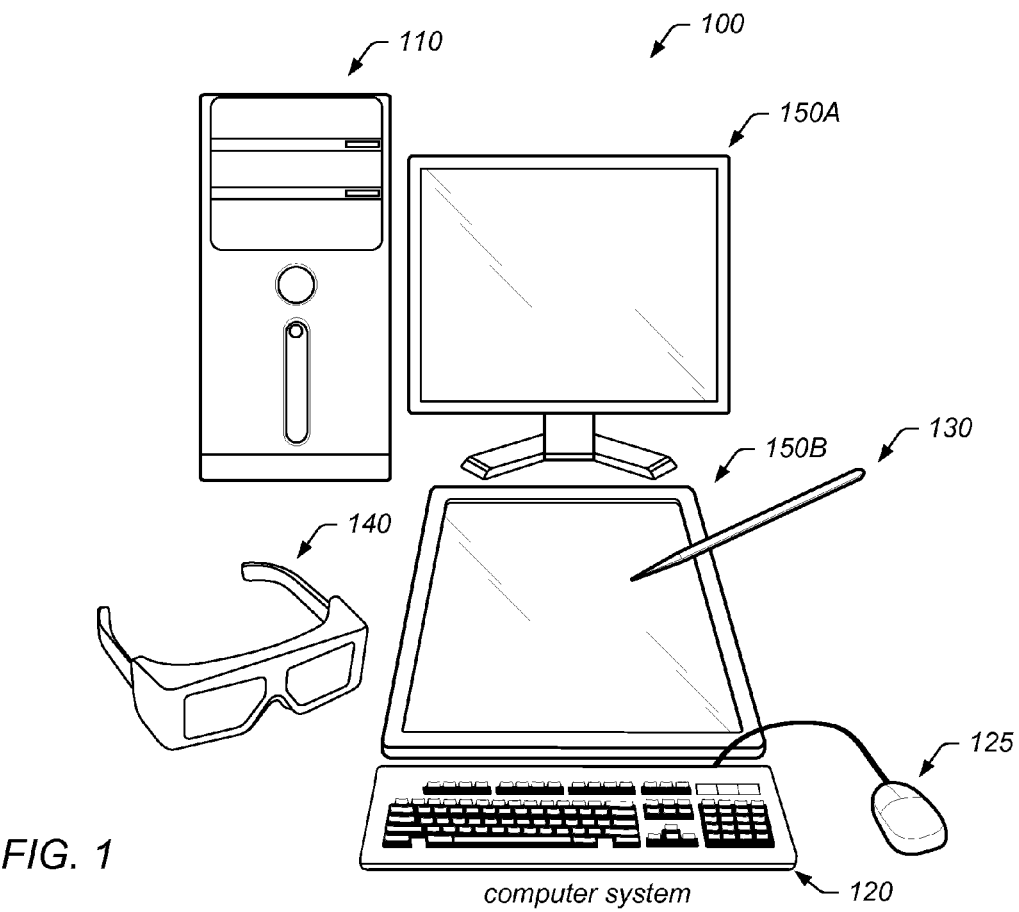
FIGS. 1 and 2 illustrate exemplary systems configured to implement various embodiments.

While the invention is susceptible to various modifications and alternative forms, specific embodiments thereof are shown by way of example in the drawings and are herein described in detail. It should be understood, however, that the drawings and detailed description thereto are not intended to limit the invention to the particular form disclosed, but on the contrary, the intention is to cover all modifications, equivalents and alternatives falling within the spirit and scope of the present invention as defined by the appended claims.

DETAILED DESCRIPTION OF THE EMBODIMENTS

Incorporation by Reference

The following references are hereby incorporated by reference in their entirety as though fully and completely set forth herein:

U.S. patent application Ser. No. 11/098,681 (U.S. Patent Publication No. 2005/0219694), titled "Horizontal Perspective Display", filed on Apr. 4, 2005.

U.S. patent application Ser. No. 11/141,649 (U.S. Patent Publication No. 2005/0264858), titled "Multi-plane Horizontal Perspective Display", filed on May 31, 2005.

U.S. patent application Ser. No. 12/797,958, titled "Presenting a View within a Three Dimensional Scene", filed on Jun. 10, 2010, whose inventors are Michael A. Vesely and Alan S. Gray.

U.S. patent application Ser. No. 13/019,384, titled "Modifying Perspective of Stereoscopic Images Based on Changes in User Viewpoint", filed on Feb. 2, 2011, whose inventors are Michael A. Vesely, Nancy L. Clemens, and Alan S. Gray.

U.S. patent application Ser. No. 13/174,448, titled "User Interface Elements for use within a Three Dimensional Scene", filed on Jun. 30, 2011, whose inventor is Michael A. Vesely.

Terms

The following is a glossary of terms used in the present application:

Memory Medium—any of various types of memory devices or storage devices. The term "memory medium" is intended to include an installation medium, e.g., a CD-ROM, floppy disks 104, or tape device; a computer system memory or random access memory such as DRAM, DDR RAM, SRAM, EDO RAM, Rambus RAM, etc.; a non-volatile memory such as a Flash, magnetic media, e.g., a hard drive, or optical storage; registers, or other similar types of memory elements, etc. The memory medium may comprise other types of memory as well or combinations thereof. In addition, the memory medium may be located in a first computer in which the programs are executed, or may be located in a second different computer which connects to the first computer over a network, such as the Internet. In the latter instance, the second computer may provide program instructions to the first computer for execution. The term "memory medium" may include two or more memory mediums which may reside in different locations, e.g., in different computers that are connected over a network.

Carrier Medium—a memory medium as described above, as well as a physical transmission medium, such as a bus, network, and/or other physical transmission medium that conveys signals such as electrical, electromagnetic, or digital signals.

Computer System—any of various types of computing or processing systems, including a personal computer system (PC), mainframe computer system, workstation, network appliance, Internet appliance, personal digital assistant (PDA), television system, grid computing system, or other device or combinations of devices. In general, the term "computer system" can be broadly defined to encompass any device (or combination of devices) having at least one processor that executes instructions from a memory medium.

Viewpoint—this term has the full extent of its ordinary meaning in the field of computer graphics/cameras. For example, the term "viewpoint" may refer to a single point of view (e.g., for a single eye) or a pair of points of view (e.g., for a pair of eyes). Thus, viewpoint may refer to the view from a single eye, or may refer to the two points of view from a pair of eyes. A "single viewpoint" may specify that the viewpoint refers to only a single point of view and a "paired viewpoint" or "stereoscopic viewpoint" may specify that the viewpoint refers to two points of view (and not one). Where the viewpoint is that of a user, this viewpoint may be referred to as an eyepoint (see below). The term "virtual viewpoint" refers to a viewpoint from within a virtual representation or 3D scene.

Eyepoint—the physical location or point of view of a single eye or a pair of eyes. A viewpoint above may correspond to the eyepoint of a person. For example, a person's eyepoint has a corresponding viewpoint.

Vertical Perspective—a perspective which is rendered for a viewpoint which is substantially perpendicular to the display surface. "Substantially perpendicular" may refer to 90 degrees or variations thereof, such as 89 and 91 degrees, 85-95 degrees, or any variation which does not cause noticeable distortion of the rendered scene (e.g., which sustains a normalized perspective of the user to the normalized display surface). A vertical perspective may be a central perspective, e.g., having a central vanishing point. In a vertical perspective, the viewpoint may have a line of site parallel to the ground plane (e.g., floor) and towards a display surface that is perpendicular to the ground plane. As used herein, a vertical perspective may apply to a single image or a stereoscopic image. When used with respect to a stereoscopic image (e.g., presenting a stereoscopic image according to a vertical perspective), each image of the stereoscopic image may be presented according to the vertical perspective, but with differing single viewpoints. The term "perpendicular perspective" may also refer to the definition above.

Horizontal Perspective—a perspective which is rendered from a viewpoint which is not perpendicular to the display surface. More particularly, the term "horizontal perspective" refers to a perspective which is rendered using a substantially 45 degree angled render plane in reference to the corresponding viewpoint. The rendering may be intended for a display which may be positioned horizontally (e.g., parallel to a ground plane, e.g. table or floor) in reference to a standing viewpoint perspective. "Substantially 45 degrees" may refer to 45 degrees or variations thereof, such as 44 and 46 degrees, 40-50 degrees, or any variation which may cause minimal distortion of the rendered scene (e.g., which sustains the appropriate angled projection of the image within the rendered scene). In a horizontal perspective, a display surface may be parallel to the ground plane, but may be some angle off parallel to the ground plane in either the horizontal or vertical direction. As used herein, a horizontal perspective may apply to a single image or a stereoscopic image. When used with respect to a stereoscopic image (e.g., presenting a stereoscopic image according to a horizontal perspective), each image of the stereoscopic image may be presented according to the horizontal perspective, but with differing single viewpoints. The term "oblique perspective" may also refer to the definition above.

Automatically—refers to an action or operation performed by a computer system (e.g., software executed by the computer system), without user input directly specifying or performing the action or operation. Thus the term "automatically" is in contrast to an operation being manually performed or specified by the user, where the user provides input to directly perform the operation. An automatic procedure may be initiated by input provided by the user, but the subsequent actions that are performed "automatically" are not specified by the user, i.e., are not performed "manually", where the user specifies each action to perform. For example, a user filling out an electronic form by selecting each field and providing input specifying information (e.g., by typing information, selecting check boxes, radio selections, etc.) is filling out the form manually, even though the computer system must update the form in response to the user actions. The form may be automatically filled out by the computer system where the computer system (e.g., software executing on the computer system) analyzes the fields of the form and fills in the form without any user input specifying the answers to the fields. As indicated above, the user may invoke the automatic filling of the form, but is not involved in the actual filling of the form (e.g., the user is not manually specifying answers to fields but rather they are being automatically completed). The present specification provides various examples of operations being automatically performed in response to actions the user has taken.

Figure 2:
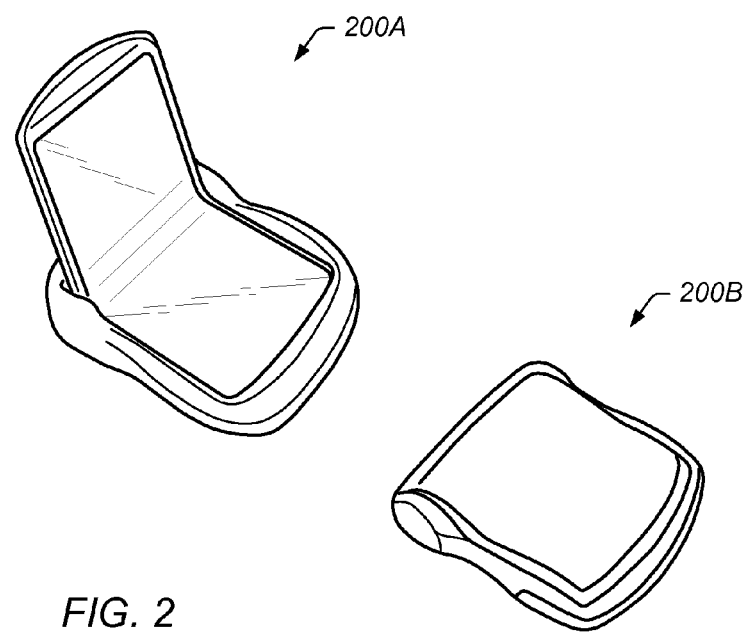

FIGS. 1 and 2—Exemplary Systems

FIGS. 1 and 2 illustrate exemplary systems which are configured to perform various embodiments described below.

In the embodiment of FIG. 1, computer system 100 may include chassis 110, display 150A and display 150B (which may collectively be referred to as display 150 or "at least one display" 150), keyboard 120, mouse 125, stylus 130, and glasses 140. In one embodiment, at least one of the displays 150A and 150B is a stereoscopic display. For example, in one embodiment, both of the displays 150A and 150B are stereoscopic displays. The displays 150A and 150B may be closely positioned to each other, e.g., where they abut. The angle formed between the displays may be any of various angles, e.g., 90 degrees, 110 degrees, etc.

The chassis 110 may include various computer components such as processors, memory mediums (e.g., RAM, ROM, hard drives, etc.), graphics circuitry, audio circuitry, and other circuitry for performing computer tasks, such as those described herein. The at least one memory medium may store one or more computer programs or software components according to various embodiments of the present invention. For example, the memory medium may store one or more graphics engines which are executable to perform the methods described herein. The memory medium may also store data (e.g., a computer model) representing a virtual space, which may be used for projecting a 3D scene of the virtual space via the display(s) 150. The memory medium may further store software for utilizing tools as described herein. Additionally, the memory medium may store operating system software, as well as other software for operation of the computer system. Various embodiments further include receiving or storing instructions and/or data implemented in accordance with the foregoing description upon a carrier medium.

As indicated above, the computer system 100 may be configured to display a three dimensional (3D) scene (e.g., via stereoscopic images) using the display 150A and/or the display 150B. The computer system 100 may also be configured to display or present tools for use, e.g., within the 3D scene using the display 150A, the display 150B, and/or another display, as described in more detail below.

It should be noted that the embodiment of FIG. 1 is exemplary only, and other numbers of displays are envisioned. For example, the computer system 100 may include only a single display or more than two displays, or the displays may be arranged in different manners than shown. In this particular embodiment, the display 150A is configured as a vertical display (which is perpendicular to a user's line of sight) and the display 150B is configured as a horizontal display (which is parallel or oblique to a user's line of sight). The vertical display 150A may be used (e.g., via instructions sent by a graphics engine executing in the chassis 110) to provide images which are presented according to a vertical (or central) perspective and the display 150B may be used (e.g., via instructions sent by a graphics engine executing in the chassis 110) to provide images which are presented according to a horizontal perspective. Descriptions of horizontal and vertical perspectives are provided in more detail below. Additionally, while the displays 150 are shown as flat panel displays, they may be any type of system which is capable of displaying images, e.g., projection systems.

Either or both of the displays 150A and 150B may present (display) stereoscopic images for viewing by the user. By presenting stereoscopic images, the display(s) 150 may present a 3D scene for the user. This 3D scene may be referred to as an illusion since the actual provided images are 2D, but the scene is conveyed in 3D via the user's interpretation of the provided images. In order to properly view the stereoscopic images (one for each eye), the user may wear the glasses 140 (although using some displays, glasses may not be necessary). The glasses 140 may be anaglyph glasses, polarized glasses, shuttering glasses, lenticular glasses, etc. Using anaglyph glasses, images for a first eye are presented according to a first color (and the corresponding lens has a corresponding color filter) and images for a second eye are projected according to a second color (and the corresponding lens has a corresponding color filter). With polarized glasses, images are presented for each eye using orthogonal polarizations, and each lens has the corresponding orthogonal polarization for receiving the corresponding image. With shuttering glasses, each lens is synchronized to alternations of left and right eye images provided by the display(s) 150. The display may provide both polarizations simultaneously or in an alternating manner (e.g., sequentially), as desired. Thus, the left eye is allowed to only see left eye images during the left eye image display time and the right eye is allowed to only see right eye images during the right eye image display time. With lenticular glasses, images form on cyclindrical lens elements or a two dimensional array of lens elements. The stereoscopic image may be provided via optical methods, where left and right eye images are provided only to the corresponding eyes using optical means such as prisms, mirror, lens, and the like. Large convex or concave lenses can also be used to receive two separately projected images to the user.

In one embodiment, the glasses 140 may be used as a position input device to track the eyepoint of a user viewing a 3D scene presented by the system 100. For example, the glasses 140 may provide information that is usable to determine the position of the eyepoint(s) of the user, e.g., via triangulation. The position input device can include an infrared detection system to detect the position the viewer's head to allow the viewer freedom of head movement or use a light sensitive detection system. Other embodiments of the input device can be the triangulation method of detecting the viewer eyepoint location, such as a camera (e.g., a CCD camera) providing position data suitable for the head tracking objectives of the invention. The input device can be manually operated by the viewer, such as a keyboard, mouse, trackball, joystick, or the like, to indicate the correct display of the horizontal perspective display images. However, any method for tracking the position of the user's head or eyepoint is envisioned. Accordingly, the 3D scene may be rendered such that user can view the 3D scene with appropriately modified projection skewing (e.g., since it is based on the eyepoint of the user). Thus, the 3D scene may be particularly rendered for the eyepoint of the user, using the position input device. In some embodiments, each eyepoint may be determined separately, or a single eyepoint may be determined and an offset may be used to determine the other eyepoint.

The relationship among the position/orientation of the display(s) 150 and the eye(s) position of the user may be used to map a portion of the virtual space to the physical space of the system 100. In essence, the physical space and components used are to be mapped to the virtual model in order to accurately render a 3D scene of the virtual space. Examples for implementing such a system are described in the incorporated-by-reference U.S. patent application Ser. No. 11/098, 681 entitled "Horizontal Perspective Display" (U.S. Patent Publication No. US 2005/0219694).

One or more of the user input devices (e.g., the keyboard 120, the mouse 125, the stylus 130, etc.) may be used to interact with the presented 3D scene. For example, the user input device 130 (shown as a stylus) or simply the user's hands may be used to interact with virtual objects of the 3D scene (via the viewed projected objects). However, this "direct" interaction may lend itself more easily to the "open space" portions of the 3D scene. Thus, at least a portion of the 3D scene may be presented in this "open space", which is in front of or otherwise outside of (e.g., behind) the at least one display. Thus, at least a portion of the 3D scene may appear as a hologram above the surface of the display 150. For example, when the horizontal display 150B is used, the 3D scene may be seen as hovering above the horizontal display. It should be noted however, that a portion of the 3D scene may also be presented as appearing below the display surface, which is not in "open space". Thus, "open space" refers to a space which the user is able to freely move and interact with (e.g., where the user is able to place his hands in the space) rather than a space the user cannot freely move and interact with (e.g., where the user is not able to place his hands in the space, such as below the display surface). Note that it is possible to have open space behind the display surface, e.g., where the user is able to put his hands behind the display surface and freely move around. Such embodiments may be particularly applicable for see-through displays. This "open space" may be referred to as a "hands-on volume" as opposed to an "inner volume" or "inner space", which may be under the surface of the display(s). Thus, the user can interact with virtual objects in the open space because they are proximate to the user's own physical space. The inner volume is located behind the viewing surface and presented objects appear inside the physically viewing device. Thus, objects of the 3D scene presented within the inner volume do not share the same physical space with the user and the objects therefore cannot be directly, physically manipulated by hands or hand-held tools. That is, they may be manipulated indirectly, e.g., via a computer mouse or a joystick.

In some embodiments, this open space interaction may be achieved by having a 1:1 correspondence between the virtual objects (e.g., in the virtual space) and projected objects (e.g., in the physical space). Thus, an accurate and tangible physical interaction is provided by allowing a user to touch and manipulate projected objects with his hands or hand held tools, such as the stylus 130. This 1:1 correspondence of the virtual elements and their physical real-world equivalents is described in more detail in U.S. Patent Publication No. 2005/0264858, which was incorporated by reference in its entirety above. This 1:1 correspondence is a new computing concept that may allow the user to directly access and interact with projected objects of the 3D scene. This new concept requires the creation of a common physical reference plane, as well as the formula for deriving its unique x, y, z spatial coordinates, thereby correlating the physical coordinate environment to the virtual coordinate environment. Additionally, the 1:1 correspondence allows the user's movement of virtual objects or other interaction (e.g., via the stylus 130) to be the same in physical space and in presented space. However, other embodiments are envisioned where there is a ratio between the distance of the user's physical movement and the corresponding movement in the presented 3D scene (e.g., of the presented object or virtual stylus).

As described below, the user may be able to interact with the 3D scene using various tools, which may be usable within the 3D scene.

The 3D scene generator stored and executed in the chassis 110 may be configured to dynamically change the displayed images provided by the display(s) 150. More particularly, the 3D scene generator may update the displayed 3D scene based on changes in the user's eyepoint, manipulations via the user input devices, etc. Such changes may be performed dynamically, at run-time. The 3D scene generator may also keep track of peripheral devices (e.g., the stylus 130 or the glasses 140) to ensure synchronization between the peripheral device and the displayed image. The system can further include a calibration unit to ensure the proper mapping of the peripheral device to the display images and proper mapping between the projected images and the virtual images stored in the memory of the chassis 110.

In further embodiments, the system 100 (e.g., the display(s) 150) can further comprise an image enlargement/reduction input device, an image rotation input device, and/or an image movement device to allow the viewer to adjust the view of the projection images.

Thus, the system 100 may present a 3D scene which the user can interact with (e.g., using UI elements or tools) in real time. The system may comprise real time electronic display(s) 150 that can present or convey perspective images in the open space and a peripheral device 130 that may allow the user to interact with the 3D scene with hand controlled or hand-held tools. The system 100 may also include means to manipulate the displayed image such as magnification, zoom, rotation, movement, and even display a new image.

Further, while the system 100 is shown as including horizontal display 150B since it simulates the user's visual experience with the horizontal ground, any viewing surface could offer similar 3D illusion experience. For example, the 3D scene can appear to be hanging from a ceiling by projecting the horizontal perspective images onto a ceiling surface, or appear to be floating from a wall by projecting horizontal perspective images onto a vertical wall surface. Moreover, any variation in display orientation and perspective (or any other configuration of the system 100) are contemplated.

FIG. 2 illustrates another embodiment of the system 100, shown as 200A and 200B. In this embodiment, the system may be a foldable and/or portable system (e.g., similar to a laptop or tablet computer) where the user may have the system 200 open (as shown in 200A) or closed (as shown in 200B). In this embodiment, the horizontal display and vertical display may be blended by a blending display. Thus, the display of the system 200 may be thought of as a plurality of combined displays, or a single display which is able to project horizontally and/or vertically, as desired.

Exemplary Systems

Embodiments of the present invention may augment the current state of real-time computer-generated 3D computer graphics and tactile computer-human interfaces with real time interaction. More specifically, these new embodiments may enable real-time computer-generated 3D simulations to coexist in physical space and time with the user interacting with the projected objects. This unique ability may be useful in many industries including, but not limited to, electronics, computers, biometrics, medical, education, games, movies, science, legal, financial, communication, law enforcement, national security, military, print media, television, advertising, trade show, data visualization, computer-generated reality, animation, CAD/CAE/CAM, productivity software, operating systems, and more.

Figure 3A:
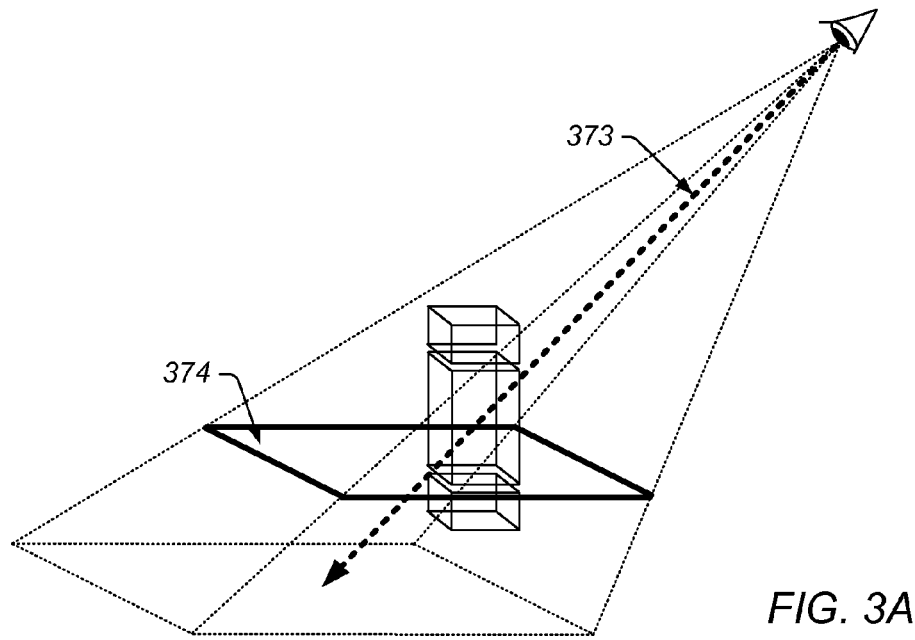
FIGS. 3A and 3B illustrate exemplary horizontal and vertical perspective projections, according to some embodiments.
Figure 3B:
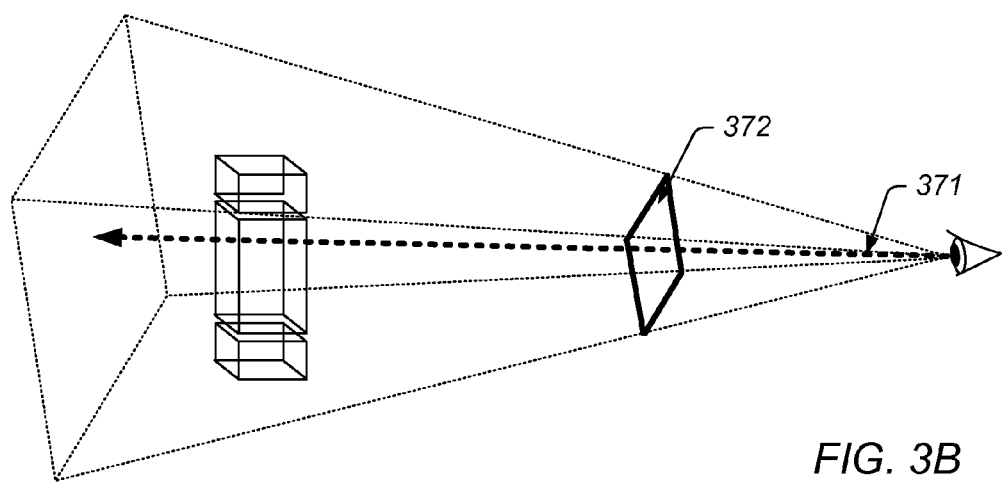

FIGS. 3A and 3B—Horizontal and Vertical Perspective

FIG. 3A illustrates an exemplary diagram of a horizontal perspective projection and FIG. 3B illustrates an exemplary diagram of a vertical perspective projection.

In the horizontal perspective of FIG. 3A, the projected image is not on the plane of vision—instead, it is on a plane angled to the plane of vision. Typically, the image would be on the ground level surface. This means the image will be physically in the third dimension relative to the plane of vision. As indicated above, it may be desirable or important that the image is viewed from the correct eyepoint, otherwise the 3D scene may not represent a physical truism.

In FIG. 3A, the object was drawn by the artist closing one eye, and viewing along a line of sight 373 45° to the horizontal display plane 374. The resulting image, when viewed horizontally at the eyepoint, (in this case, for a single image at 45° and through one eye) looks the same as the original image. In FIG. 3B, the object in the 3D scene (three blocks stacked slightly above each other) was drawn by the artist closing one eye, and viewing along a line of sight 371 perpendicular to the vertical display plane 372. The resulting image, when viewed vertically, straight on, and through one eye, looks the same as the original image.

As can be seen, one major difference between vertical (e.g., central) perspective shown in FIG. 3B and horizontal perspective in FIG. 3A is the location of the display plane (374 and 372) with respect to the projected 3D image. In the horizontal perspective of FIG. 3A, the display plane can be adjusted up and down, and therefore the projected image can be conveyed in the open air above the display plane, e.g., a user can touch (or more likely pass through) the illusion, or it can be displayed under the display plane, e.g., a user cannot touch the illusion because the display plane physically blocks the hand. This is the nature of horizontal perspective, and as long as the rendering viewpoint and the user's eyepoint are at the same place, the illusion is present. In contrast, for the single eye vertical (e.g., central) perspective of FIG. 3B, the 3D illusion is likely to be only inside the display plane, meaning one cannot touch it. However, using stereoscopic images, both perspectives can convey the 3D scene in "open space".

Figure 4A:
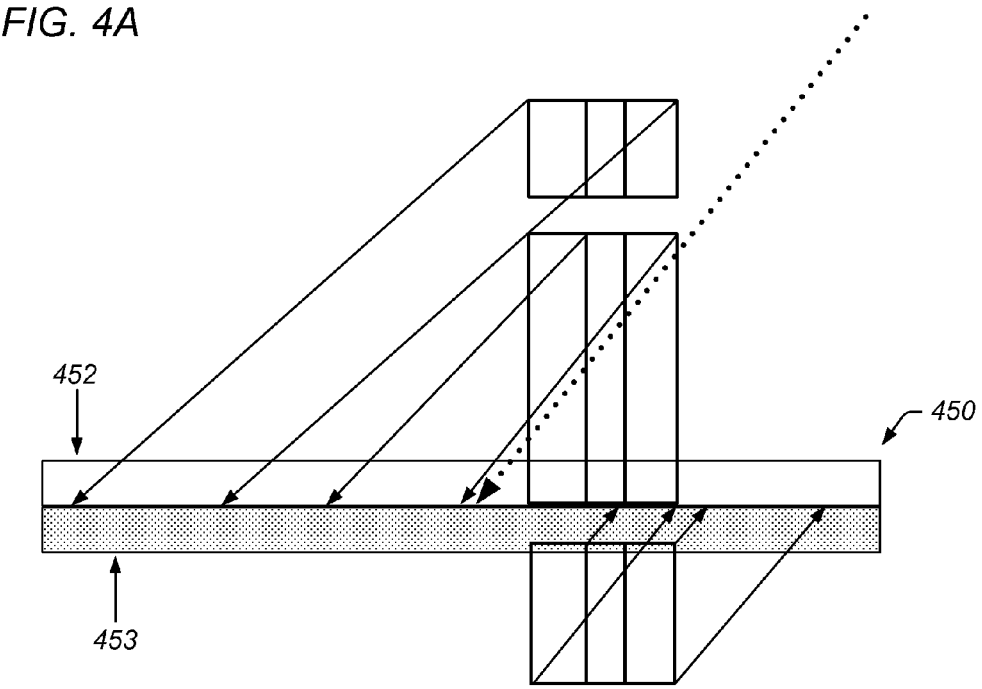
FIGS. 4A and 4B illustrate an exemplary horizontal display with a corresponding horizontal projection, according to some embodiments.
Figure 4B:
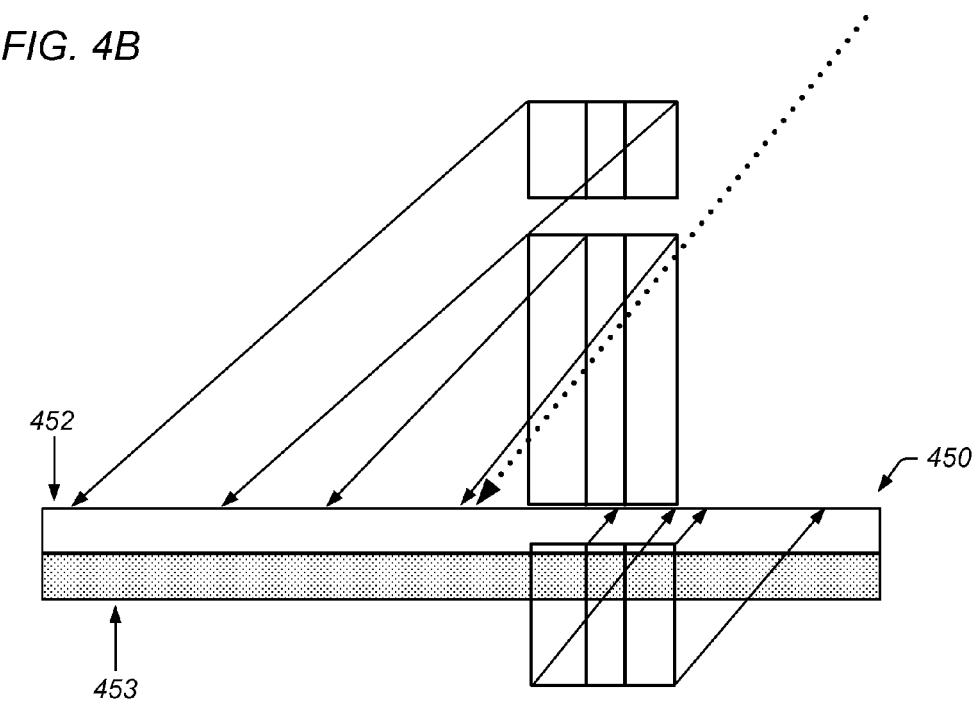

FIGS. 4A and 4B—Display Adjustment for Horizontal Perspective

The display(s) 150 may be made of many physical layers, individually and together having thickness or depth. To illustrate this, FIGS. 4A and 4B illustrate a conceptual side-view of a typical LCD display 450 (an embodiment of one or more of the displays 150). FIGS. 4A and 4B also illustrate how the projected 3D scene can include a portion in open space and another portion in the inner volume.

The top layer of the display 450 is the physical "view surface" 452, and the imaging layer (liquid crystal layer), where images are made, is the physical "image layer" 453. The view surface 452 and the image layer 453 are separate physical layers located at different depths or z coordinates along the viewing device's z axis. To display an image, the LCD's polarized light is provided from the image layer 453 through the view surface 452 (which may be glass).

In the example shown in FIGS. 4A and 4B, the same blocks from 3A and 3B are shown with a horizontal perspective. As shown, the middle block in FIG. 4A does not correctly appear on the view surface 452. In FIG. 4A, the imaging layer, i.e. where the image is made, is located behind the view surface 452. Therefore, the bottom of the middle block is incorrectly positioned behind or underneath the view surface 452.

FIG. 4B illustrates an example of the proper location of the three blocks on the display 450. That is, the bottom of the middle block is displayed correctly on the view surface 452 and not on the image layer 453. To make this adjustment, the z coordinates of the view surface 452 and image layer 453 are used by the 3D scene generator to correctly render the image.

Thus, the unique task of correctly rendering an open space image on the view surface 452 versus the image layer 453 may be critical in accurately mapping the 3D scene objects to the physical projected space.

Thus, the display's view surface 452 is the correct physical location to demarcate the division between open space and inner space and hence image rendering must use this view surface thickness as an offset when intending to render scenes where the object is to be fully conveyed in open space. Therefore, the top of the display's view surface 452 is the common physical reference plane. However, only a subset of the view surface 452 can be the reference plane because the entire view surface may be larger than the total image area.

Many viewing devices enable the end user to adjust the size of the image area within the viewing region of the viewing devices by adjusting certain x and y values. However, all three, x, y, z, coordinates are important to determine the location and size of the common physical reference plane. The formula for this is: The image layer 453 is given a z coordinate of 0. The view surface is the distance along the z axis from the image layer 453. The reference plane's z coordinate is equal to the view surface 452, i.e., its distance from the image layer 453. The x and y coordinates, or size of the reference plane, can be determined by displaying a complete image on the viewing device and measuring the length of its x and y axis.

The concept of the common physical reference plane is not common. Therefore, display manufactures may not supply its coordinates. Thus a "reference plane calibration" procedure may need to be performed to establish the reference plane coordinates for a given display surface. This calibration procedure may provide the user with a number of orchestrated images with which he interacts. The user's response to these images provides feedback to the 3D scene generator such that it can identify the correct size and location of the reference plane. In one embodiment, when the end user is satisfied and completes the procedure the coordinates are saved in the end user's personal profile. With some displays, the distance between the view surface 452 and image layer 453 is quite small. But no matter how small or large the distance, it is critical that all Reference Plane x, y, and z coordinates are determined as close as technically possible within certain tolerance, e.g., optimally less than a quarter inch.

After the mapping of the "computer-generated" horizontal perspective projection display plane to the "physical" reference plane x, y, z coordinates, the two elements are essentially coincident in space; that is, the computer-generated horizontal plane now shares the real-world or physical x, y, z coordinates of the physical reference plane.

Figure 5A:
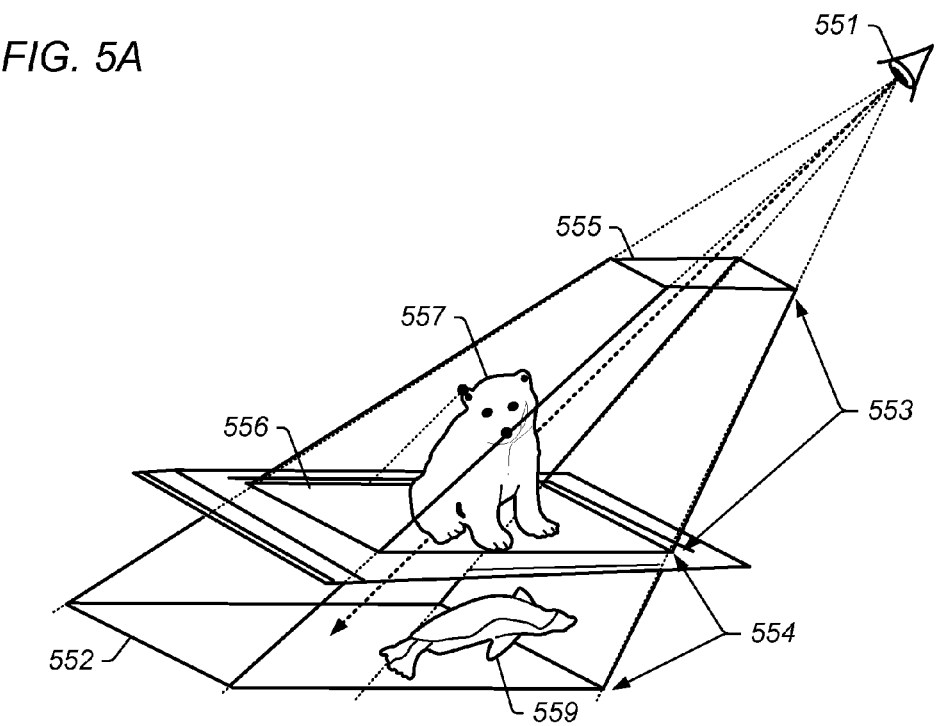
FIGS. 5A and 5B illustrate exemplary view volumes of a horizontal projection, according to some embodiments.
Figure 5B:
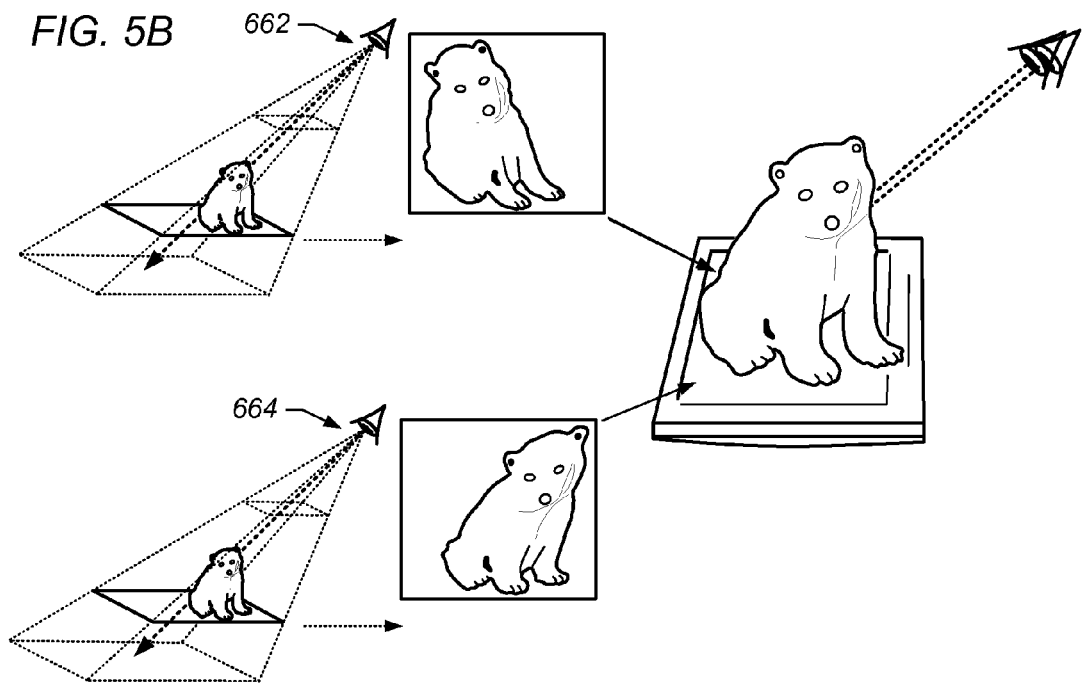

FIGS. 5A and 5B—Exemplary Mono and Stereo View Volumes in Horizontal Perspective FIGS. 3A and 3B illustrate "view volumes" of the horizontal and vertical perspectives, respectively, for a single eye. FIG. 5A illustrates a more detailed single eye view volume in a horizontal perspective, and FIG. 5B illustrates the view volumes of a stereoscopic image.

Mathematically, the computer-generated x, y, z coordinates of the viewpoint (e.g., corresponding to a user's eyepoint) form the vertex of an infinite pyramid, whose sides pass through the x, y, z coordinates of the reference/horizontal plane. FIG. 5A illustrates this infinite pyramid, which begins at the viewpoint 551 and extends through the far clip plane (not shown). There are new planes within the pyramid that run parallel to the reference/horizontal plane 556, which, together with the sides of the pyramid, define two new volumes. These unique volumes are called open space volume 553 and the inner volume 554, which were described previously. As shown, the open space volume 553 may exist within the pyramid between and inclusive of the comfort plane 555 and the reference/horizontal plane 556. As indicated above, in one embodiment, a user may interact with 3D objects located within the inner volume 554 via a computer mouse, joystick, or other similar computer peripheral. The plane 556 along with the bottom plane 552, are two of the planes within the pyramid that define the inner volume 554. Note that while the bottom plane 552 is farthest away from the viewpoint 551, it is not to be mistaken for the far clip plane.

FIG. 5A also illustrates a plane 555, called the comfort plane. The comfort plane 555 is one of six planes that define the open space volume 553, and of these planes it is closest to the viewpoint 551 and parallel to the reference plane 556. The comfort plane (or near plane) 555 is appropriately named because its location within the pyramid determines the user's personal comfort, e.g., how his eyes, head, body, etc. are situated while viewing and interacting with simulations. The user can adjust the location of the comfort plane 555 based on his personal visual comfort through a "comfort plane adjustment" procedure, where the user can adjust the position or closeness of the plane 555. This procedure may provide the user with various 3D scenes within the open space volume 553 and may enable him to adjust the location of the comfort plane 555 within the pyramid relative to the reference plane 556. When the user is satisfied and completes the procedure, the location of the comfort plane 555 may be saved in the user's personal profiles. Other planes, such as the bottom plane may be adjusted similarly.

FIG. 5B illustrates the provision of a stereoscopic image to two single viewpoints (corresponding to two eyes) viewing the 3D scene of the polar bear. As shown, viewpoint 662 may correspond to a user's right eyepoint and viewpoint 664 may correspond to a user's left eyepoint. By rendering and presenting a stereoscopic image according to these single viewpoints, a 3D scene of the polar bear may be provided to the user, e.g., using the glasses 140 as described above.

Figure 6:
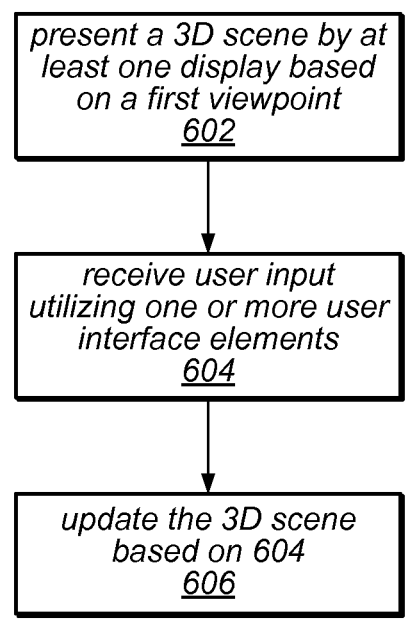
FIG. 6 is a flowchart diagram illustrating one embodiment of a method for utilizing tools in a 3D scene.

FIG. 6—Utilizing Tools within a 3D Scene

FIG. 6 illustrates a method for utilizing tools/user interface elements within a 3D scene. The method shown in FIG. 6 may be used in conjunction with any of the computer systems or devices shown in the above Figures, among other devices. In various embodiments, some of the method elements shown may be performed concurrently, in a different order than shown, or may be omitted. Additional method elements may also be performed as desired. As shown, this method may operate as follows.

In 602, a 3D scene may be presented by at least one display (e.g., the display(s) 150). More particularly, one or more stereoscopic images of the 3D scene may be presented by the display(s). The 3D scene may be presented according to a first viewpoint. For example, the first viewpoint may be based on an eyepoint of a user viewing the 3D scene. In one embodiment, the method may include determining the first viewpoint, e.g., by determining the eyepoint of the user viewing the 3D scene. The method may determine the eyepoint of the user using various techniques, such as a position input device (e.g., glasses which provide eyepoint position information), triangulation, head/eye tracking, etc. Accordingly, the 3D scene may be rendered such that the user can view the 3D scene with appropriately modified projection skewing (e.g., since it is based on the eyepoint of the user). More specifically, when the 3D scene is based on the user's eyepoint, the 3D scene is rendered based on the perspective as would be seen by the viewer. This rendering avoids much of the perceived skewing that would be conveyed if the viewpoint of the scene did not match the eyepoint of the viewer. In other words, a displayed object retains the correct perspective as perceived by the viewer as long as the viewer eyepoint and 3D scene viewpoint remain in correspondence.

As indicated above, the 3D scene may be presented by a single display or a plurality of displays. In one embodiment, the 3D scene may be presented by a vertical display and a horizontal display. For example, the vertical display may present a first stereoscopic image, e.g., according to a vertical perspective, and the horizontal display may present a second stereoscopic image, e.g., according to a horizontal perspective. These two stereoscopic images may form or convey the 3D scene to the user. In further embodiments, the two displays may be joined by a curvilinear or blending display, which may also present a stereoscopic image. The stereoscopic image of the blending display may operate to blend the stereoscopic images of the vertical and horizontal displays. Other numbers and types of displays are contemplated for presenting the 3D scene.

At least a portion of the 3D scene may be presented in "open space" in front of or otherwise outside of the at least one display. Thus, at least a portion of the 3D scene may appear as a hologram above the display surface. For example, when a horizontal display is used, the 3D scene may be seen as hovering above the horizontal display. It should be noted however, that a portion of the 3D scene may also be presented as appearing behind the display surface, which is not in "open space". Thus, "open space" refers to a space in which the user is able to freely move and interact (e.g., where the user is able to place his hands in the space) rather than a space in which the user cannot freely move nor interact (e.g., where the user is not able to place his hands in the space, such as below the display surface). This "open space" may be referred to as a "hands-on volume" as opposed to an "inner-volume", which may be under the surface of the display(s). Thus, the user can directly interact with objects (displayed virtual objects) in the open space because they co-inhabit the physical space proximate to the user. The inner volume is located behind the viewing surface, and portions of the 3D scene within this inner volume appear "inside" the physical viewing device. Thus, objects of the 3D scene presented within the inner volume do not share the same physical space with the user, and the objects therefore cannot be directly, physically manipulated by hands or hand-held tools. That is, objects displayed within the inner volume may be manipulated indirectly, e.g., via a computer mouse or a joystick.

In one particular embodiment, the 3D scene may be provided by a display system which conveys two distinct images, where one image is conveyed to be seen by a left eye of a user and a second image is conveyed to be seen by a right eye. The display may be in one of many pitch, yaw, or roll orientations and may have a defined 0 parallax position. For example, two images of a stereo image pair may have a common appearance object feature in the same overlapping location on the screen, hence each eye sees the same object feature at the same location on the screen. Object features that are off parallax may be considered object features that have a common appearance (though the appearance may be slightly different for each eye view), but are slightly different locations on the screen as seen by each eye. Depending upon the perspective and the orientation of the screen to the viewer, the distinct projection and the distinct placement of the object feature on the screen as seen by each eye may be different.

In 604, user input may be received to the 3D scene using one or more user tools. The user input may be received via a user interface device, e.g., whose 3D position is controlled by the user. For example, the user may interact via a stylus, glove, or even using his fingers with an appropriate detection mechanism. Further, the user may interact with a keyboard or other non-direct interaction user input device. The user may interact with the 3D scene using any of various tools or user interface elements described herein, among others. Particular tools are described in more detail below.

In some embodiments, use of various ones of the tools may also depend on or use the position of viewpoints or head tracking Accordingly, the method may involve tracking the viewpoint or head of one or more users and using the tools accordingly. For example, in one embodiment, the head tracking may identify where in relation to the display the head is positioned (e.g., in at least three of pitch, yaw, and roll, plus X, Y, and Z).

In 606, the 3D scene may be updated based on the user input to the 3D scene using the one or more tools in 604. More details regarding the changes are provided in the sections below. In updating the 3D scene, the method may add or remove images within the 3D scene, but may still present the updated 3D scene in the manner described in 602 (e.g., via stereoscopic images).

Additionally, the 3D scene may be updated based on changes of the first viewpoint (e.g., corresponding to changes of the eyepoint of a user). For example, the user may move his head, thereby changing the eyepoint location. Accordingly, a next viewpoint (which corresponds to the user's new eyepoint) may be determined after displaying the 3D scene. Based on this next viewpoint, the 3D scene may be updated and an updated stereoscopic image of the 3D scene may be provided by the display(s). Presenting the 3D scene according to the first viewpoint and updating according to a new viewpoint may be performed in the manner described in U.S. patent application Ser. No. 13/019,384, which was incorporated by reference in its entirety above.

FIGS. 7A-29B: Exemplary Tools in a 3D Scene

FIGS. 7A-27F-28F illustrate various embodiments of tools or user interface elements that may be used in interacting with a 3D scene. The tools referred to below generally relate to graphical objects, typically 3D objects or icons, that are created or rendered in the 3D scene. The user may provide input to cause a respective tool to be displayed within the 3D scene. These tools may be useable by a user (e.g., manipulated by a user) to perform some function or operation within the 3D scene, as described herein. For example, a user may manipulate the tool using a stylus or other apparatus, such as a virtual reality glove, etc. In some embodiments, the user actually uses a stylus or other input device to provide input to the system, and the currently displayed tool object in the 3D scene indicates the actual function or operation that is performed in the 3D scene based on this input. Thus, when tool A is presented in the 3D scene, user input to a button A on the stylus (or other user control) may cause operation A to be performed, whereas when tool B is presented in the 3D scene, user input to button A on the stylus may cause operation B to be performed, etc. user interface (UI) elements described herein may be different from typical objects displayed in the 3D scene. Note that UI elements may be a special type of content object which may be used to interact or modify the presented 3D scene. The UI elements may or may not be a scene object. Note that while the embodiments are shown with respect to a single display 150B, they may be used with any of the described systems above, e.g., the display 150A, both displays 150, and/or via other combinations or devices.

Figure 7A:
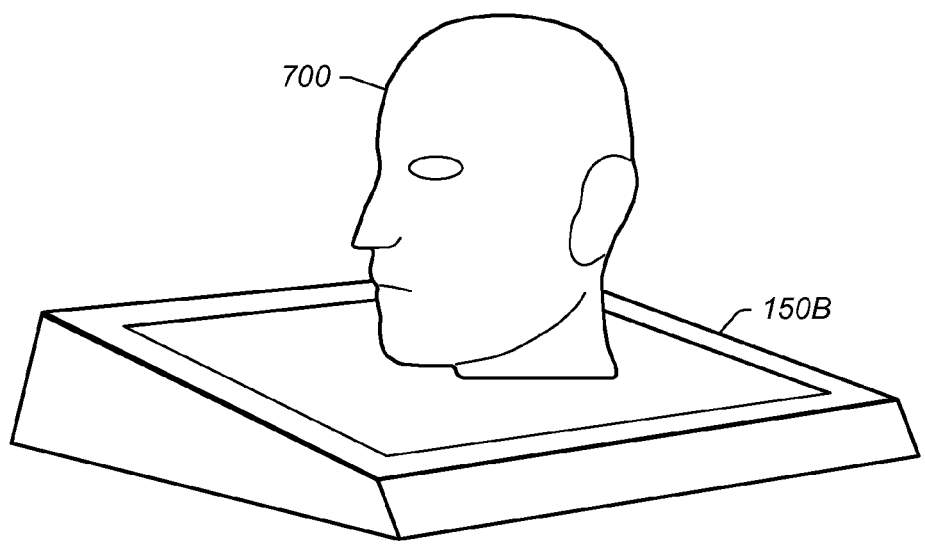
FIGS. 7A-29B illustrate various tools/user interface elements and their uses according to various embodiments of the invention.
Figure 7B:
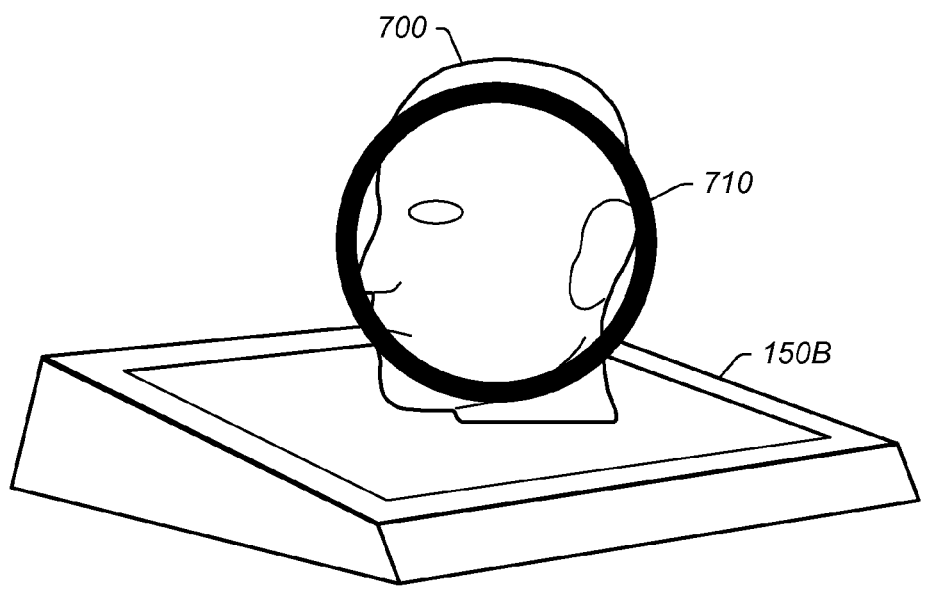
Figure 7C:
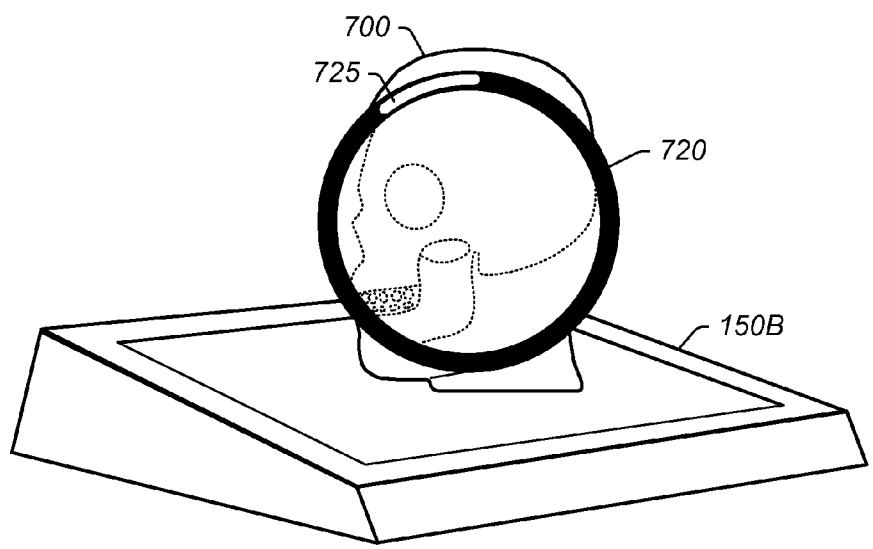
Figure 7D:
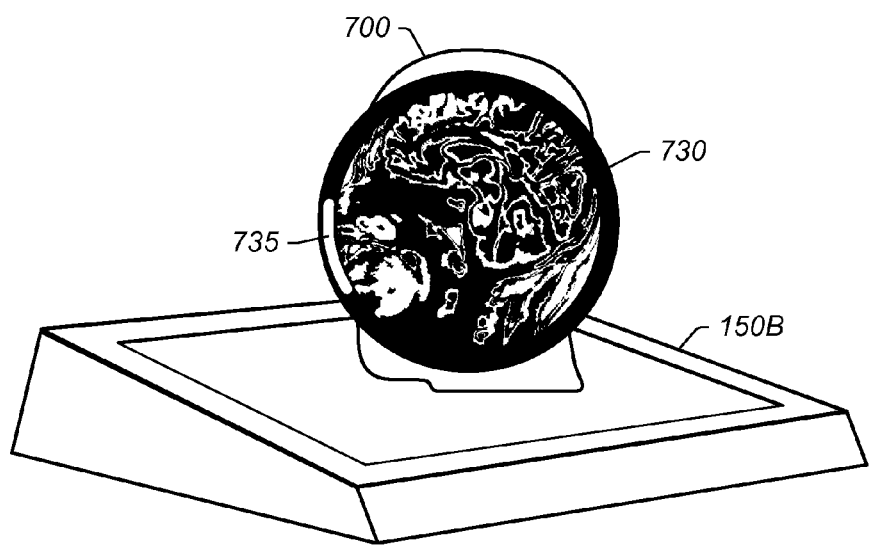
Figure 7E:
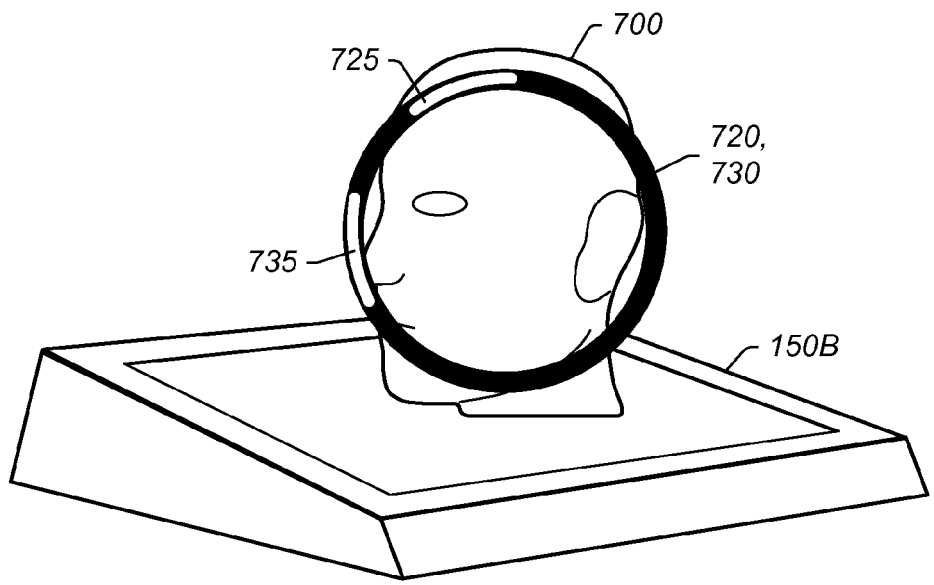
Figure 7F:
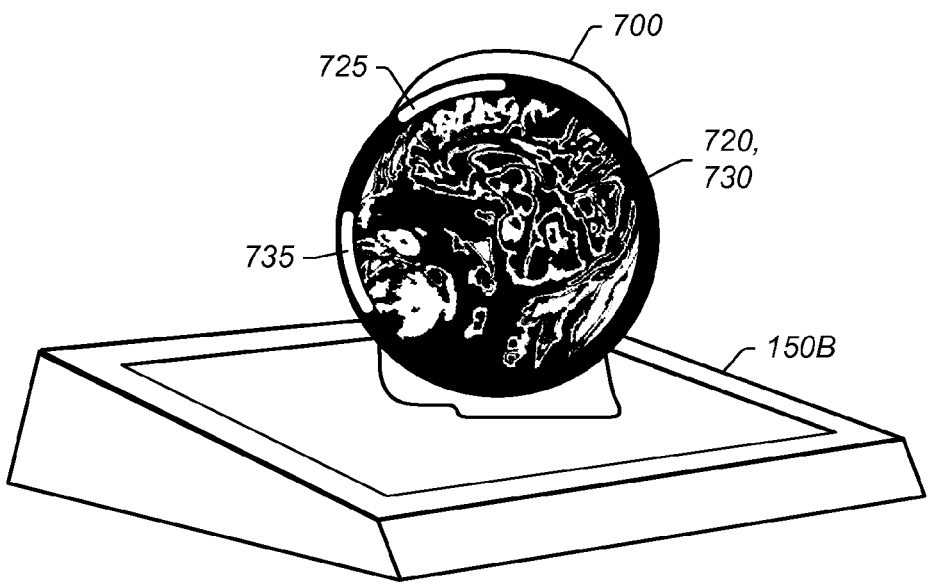

FIGS. 7A-7F present one embodiment for utilizing a plurality of tools simultaneously in a 3D scene. As shown in FIG. 7A, a head 700 may be presented for display by the display 150B. FIG. 7B illustrates a loupe tool and corresponding loupe tool region 710 which are presented in the 3D scene. As shown in FIG. 7C the loupe tool may be an X-ray loupe tool 720, which may have a marker 725 indicating the X-ray loupe tool (e.g., with the color purple). Thus, the user may position the X-ray loupe tool 720 on the head 700 to view an X-ray image of the head 700 within the region 710. In FIG. 7D, a second loupe tool is shown, referred to as cat scan loupe tool 730, indicated by region 735 (e.g., which may be a different color, such as green). Thus, the user may position the cat scan loupe tool 730 over the head 710 in the 3D scene to view a CAT (Computerized Axial Tomography) scan of the head 700 within the region 710. In FIG. 7E both tools may be positioned over the head 700 in the region 710. As shown in FIG. 7F, the area of the head within the region 710 may present an X-ray/CAT scan overlay. Thus, two tools may be used simultaneously on an object in a 3D scene.

Figure 8:
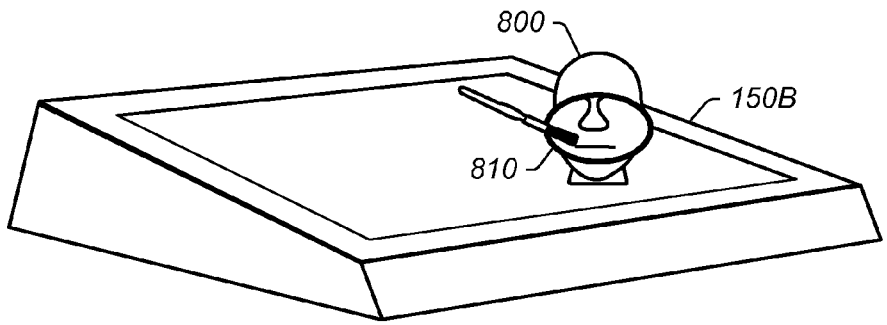

FIG. 8 illustrates another embodiment of using two tools simultaneously. In this embodiment, the user may initially position a magnify tool or loupe 710 over the head 800. The user may be able to "lock" or fix the magnify tool and then select a new tool, e.g., the paintbrush tool 820. Accordingly, the user may be able to use the paintbrush tool 820 within the magnify tool 810 and thus apply the paint in the magnified region, thereby allowing for a finer granularity of control. In another embodiment, the paintbrush tool 820 may be a scalpel or other type of tool.

While the above embodiments have been described with only two tools, more than two may be used simultaneously. Additionally, various combinations of tools are envisioned other than those above.

Figure 9:
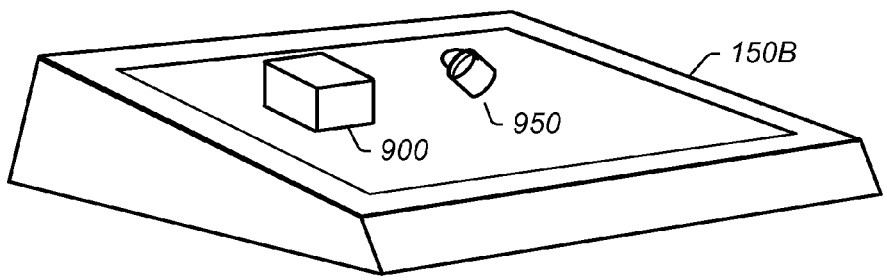

FIG. 9 illustrates one embodiment of a filling tool 950. As shown, a 3D object (e.g., a cube) 900 may be presented in the 3D scene. The filling tool 950 may also be presented for display within the 3D scene, e.g., in response to user input. The user may utilize the filling tool 950 to color portions or all of the 3D object 900. For example, the user may use the filling tool 950 to color one side of the cube 900, all the exterior sides of the cube 900, the interior sides of the cube 900, the entire volume of the cube 900, etc. In other embodiments, the user may utilize the filling tool to specify a 2D or 3D object in the 3D scene and that object may be colored according to a selected color. For example, the user may specify the points of the cube 900, and the points may be connected to form the cube 900 and filled with the selected color. Further, splines may be used rather than simple lines (e.g., formed via connections of points described above). Note that while only color is described above, the filling tool may be used to associate any characteristic or attribute with a portion or all of a 3D object in a 3D scene (e.g. gradient fills, transparency, textures, images, other graphic objects, etc.). As noted above, the user may manipulate the filling tool 950 with a stylus or other device.

Figure 10:
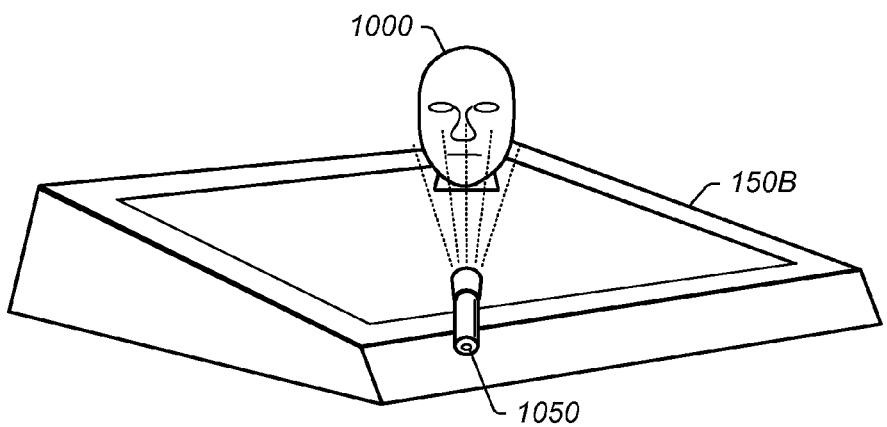

FIG. 10 illustrates one embodiment of a flashlight tool. The flashlight tool is an icon (3D icon) or object in the 3D scene that preferably has the appearance of a light source, such as a flashlight, and which provides "virtual light" in the 3D-scene, such that the 3D scene is created or rendered based on the presence of this light source. Alternatively, the tool may simply emit light from a cursor position without such an icon and may be manipulated via a stylus. As shown, the user may use a flashlight tool 1050 to illuminate a portion of the 3D scene, in this case the face of the head 1000. According to various embodiments, the beam of the flashlight 1050 may have variable intensities. The beam's intensity may be adjusted manually by the user's specifying a desired intensity or may be adjusted automatically. For example, the beam's intensity may be automatically modified or set based on the objects in the flashlight's frustum. In some embodiments, the effect of the illumination may be based on either user settings or metadata of the objects in the flashlight's frustum view.

In one embodiment, the light emanating from the flashlight tool may be shown in three dimensions within the 3D scene, as shown in FIG. 10. Thus, the user may be able to view the light emanating from the flashlight tool, much as if the user were viewing the light emanating from an actual flashlight.

In another embodiment, the flashlight tool may acts as a directional highlighter, in that the object in line with the pointed direction of the tool is highlighted or illuminated without presentation of light emanating from the flashlight tool. Thus, the user may be able to illuminate objects in a dark scene by selecting or pointing at each object, e.g., with a stylus, and those objects may become illuminated. This embodiment does not require that a flashlight beam be presented in the 3D scene and accordingly, the flashlight tool may be largely invisible to the user, other than the resulting illumination of objects. In one embodiment, the object may be illuminated via an increase in luminance or a color shading of the selected objects. Thus, instead of illuminating a frustum of the 3D scene, illumination properties of objects may be changed based on selection by the user. In some embodiments, there may be a first tool for a flashlight (including an illuminated frustum) and a second tool for object illumination (as just described).

The user may be able to "reach into" the 3D scene and manipulate the flashlight tool, e.g., to turn it on and off, change the beam's intensity, change the focus of the beam, etc. In one embodiment, the user may be able to adjust the focus of the beam emanating from the flashlight tool. For example, much like a physical flashlight, the flashlight tool may have a piece near its end where a user can "turn" or rotate the piece to change the focus of the flashlight tool. Thus the user may be able to "reach into" the 3D scene and manipulate this virtual piece of the flashlight tool to change the focus of the beam, the intensity, etc.

The system may perform the appropriate lighting calculations to display the correct lighting in the 3D scene based on the presence of the flashlight tool within the 3D scene. For example, the system may use information regarding the position, orientation, intensity, focus, etc., of the flashlight tool to compute the manner in which the "virtual light" from the flashlight tool effects the 3D scene, including reflections, shadows, ambient lighting considerations, etc.

Figure 11A:
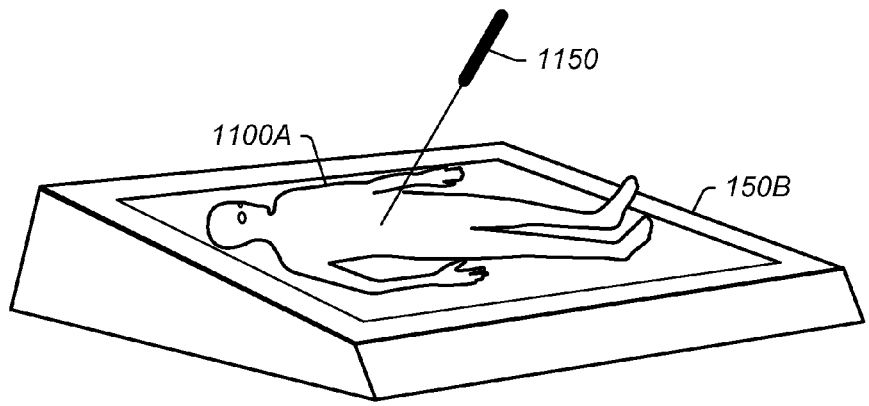
Figure 11B:
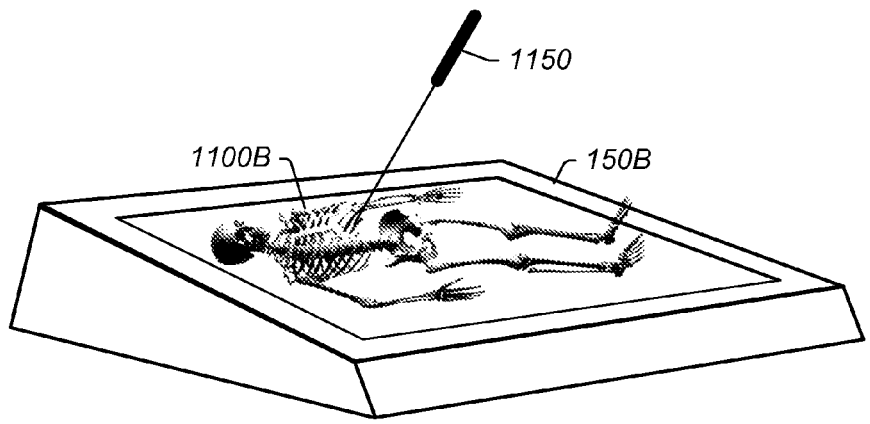

FIGS. 11A and B illustrate an embodiment of a tool 1150 where the user may be able to view inner layers of an object in the 3D scene. For example, the user may be able to "peel back" or entirely remove outer layers of an object in the 3D scene in order to view inner ones. In the embodiment of FIG. 11A, the 3D scene may present a human body 1100A and the user may wish to view inner layers of the body. The user may provide input to cause the tool 1150 to be displayed within the 3D scene. In FIG. 11B, the user has used the tool 1150 to remove the layers from the skin to down to the bones, revealing the skeleton 1100B of the body. Note that in some embodiments, more layers may be removed before reaching the skeleton, e.g., first revealing the muscles of the body, nervous systems, organs, etc. In some embodiments, the tool 1150 may have a projected beam which may pass through an object successively to select an inner layer. When penetrating through a layer, the outer layer may disappear or become transparent. In some embodiments, the user may provide various inputs (e.g., by depressing a button on the stylus, using a gesture with the stylus, touching the stylus in a specific manner, or using other input devices, as desired) when using the tool 1150 to penetrate each outer layer. In some embodiments, this tool may be invoked automatically, e.g., when the laser of the stylus is selecting or pointing at a multilayer object. In some embodiments, initially, the outer layer may be highlighted, but as the user clicks in or otherwise provides input, the next layer is revealed/highlighted. The user may be able to reverse the process via a different input (e.g., a right click or opposite gesture, among other possibilities). In further embodiments, if multiple objects are in the line of the tool 1150, then an input of various sorts (e.g., a shift-click) may be used to jump from object to object.

Figure 12:
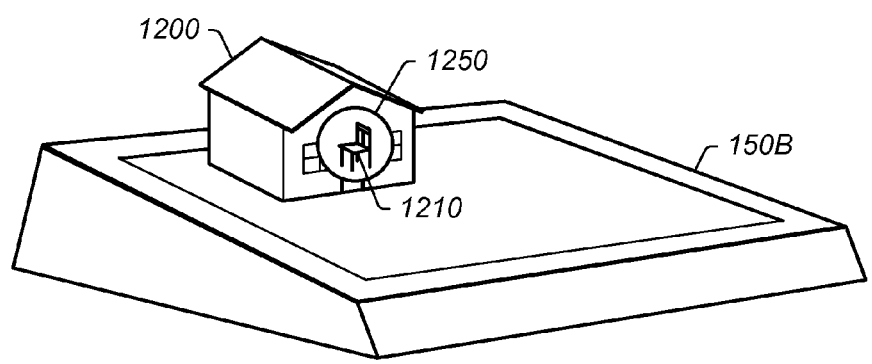

FIG. 12 illustrates an embodiment of a tool where portions of the 3D scene may be made to become transparent, e.g., to allow the user to view the 3D scene in a new way. In the embodiment shown, house 1200 displayed in the 3D scene may normally be opaque, and the inside of the house 1200 may not be visible. The user may provide input to cause a gradient tool 1250 to be displayed in the 3D scene. The user may utilize the gradient tool 1250, which may make a portion of the 3D scene gradually transparent, so that the user may view objects inside the house 1200, such as the chair 1210. In the embodiment shown, the transparency may be within the circle or cone of the gradient tool 1250. When manipulated as a cone, the transparency may be higher at the base and lower at the point, thereby allowing the user to see inside objects. In some embodiments, this gradient of transparency may apply to the entire scene, such that objects at or near the base level are transparent and objects at or near the tip are opaque, regardless of where the objects are in the scene. Alternatively, this effect may slowly diffuse from the gradient tool's application. In these embodiments, a user could therefore use the tool to selectively view levels of objects in the 3D scene. Using the example of FIG. 12, by using the tool to see the chair 1210, the entire front of the house may become transparent such that the user could see the complete interior of the house. In another example, where the chair may be in a room behind a first room, the house outer wall may be fully transparent, a couch within a first room may show as partially transparent, the wall separating the first room from the room behind may be less transparent, and finally the chair within the room behind may be mostly opaque. Furthermore the shape of the region from most transparent to mostly opaque could be conic or any number of three dimensional shapes. Thus, the gradient tool may allow the user to see more details of a desired object by making objects around it transparent. The tool may be used on single objects, subobjects, or groups of objects, as desired.

Figure 13A:
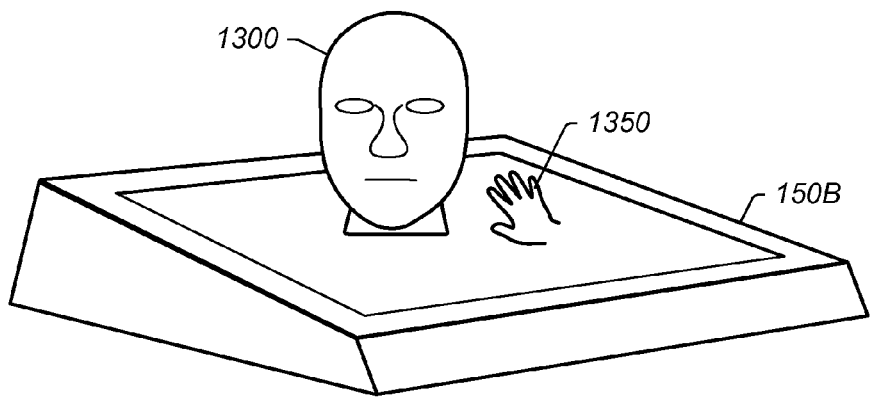
Figure 13B:
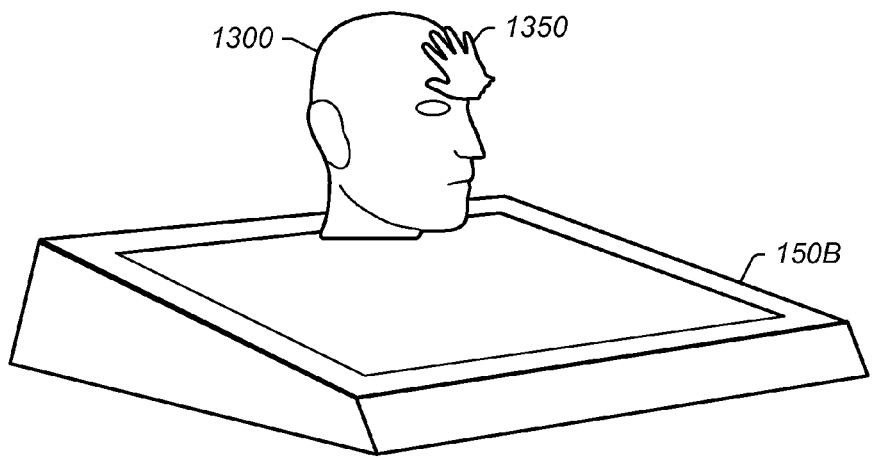

FIGS. 13A and 13B illustrate one embodiment of a "grab" tool 1350. The user may provide input to cause the grab tool 1350 to be displayed within the 3D scene. The user may use the grab tool 1350, e.g., which may resemble a hand, as shown, to select an object, such as the head 1300. When the object is "grabbed", the user may be able to move it around in any axis of the 6 degrees of freedom. For example, the user may be able to manipulate the stylus to cause the object to spin on any axis, move up, down, left, right, forward, back, pitch, yaw, etc.). The object may be picked up and moved in any position, but, unlike the real world, moving the object in virtual space may allow the user to leave the object in any position, irrespective of scene context. In one example, the repositioned object may appear to be hovering in space, where it is left. In the embodiment of FIG. 13B, the user has used the tool 1350 to rotate the head 1300.

Figure 14A:
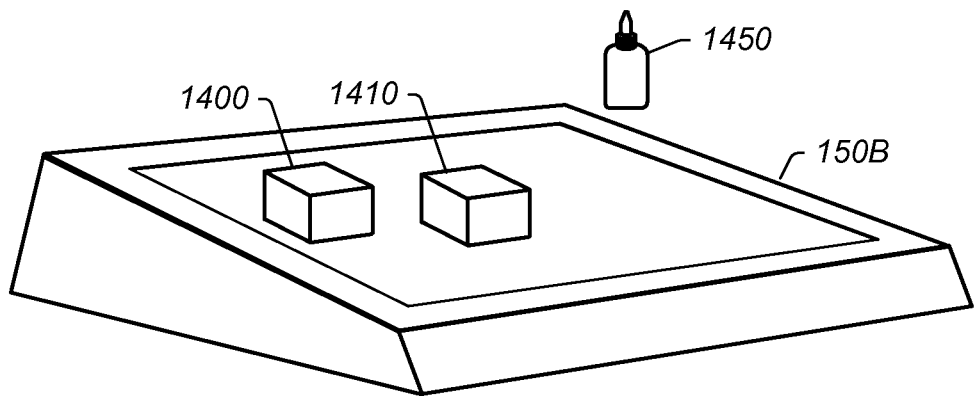
Figure 14B:
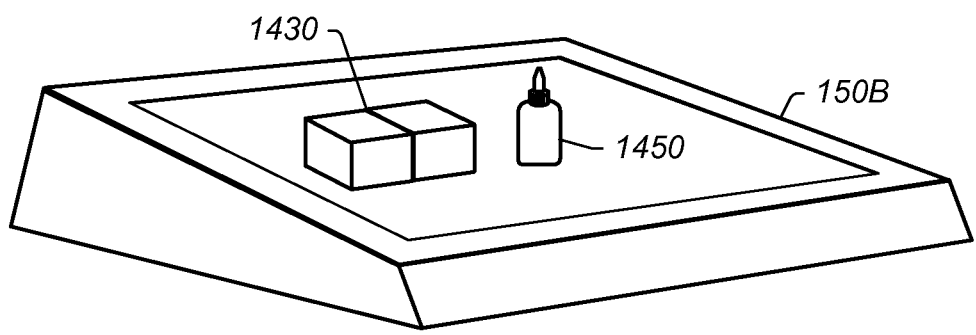

FIGS. 14A and 14B illustrate one embodiment of a grouping tool 1450. The grouping tool may allow a user to group multiple objects in a 3D scene into one selectable object in the 3D scene. This may be performed in a variety of ways. For example, the multiple objects may be physically abutted and connected. In the embodiment of FIG. 14A, the user uses the grouping tool 1450 (e.g., resembling a glue bottle) to abut the two cubes 1400 and 1410 into 1430 as shown in FIG. 14B. However, in further embodiments, the objects may not need to be abutted and may be joined via a visible connection. However, the tool may simply group them together for future selections without a visible connection between the objects. For example, when these items are grouped, selection and/or manipulation of one item may result in selection or manipulation of the grouped items. Even when there is no visible connection between the grouped items, they group may visibly indicated, e.g., via color coding, a surrounding block, etc. Thus, FIGS. 14A and 14B illustrate one embodiment of a tool that a user may use to connect multiple objects together into one larger unit, or structure.

Figure 15:
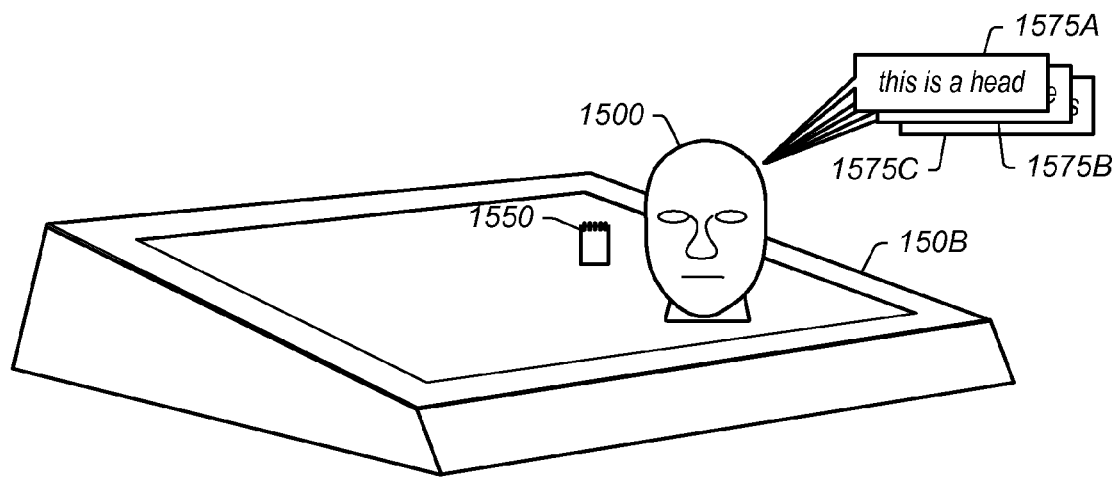

FIG. 15 illustrates one embodiment of a note tool 1550 which may be used to append or create notes 1575A-C. In some embodiments, these notes may be associated with the head 1500, e.g., they may be stored with the object and/or grouped with the head 1500. As shown, the created notes indicate the head, eyes, nose, on each page. In various embodiments, the notes may be attached to any object, may be paged (e.g., with the pages visible in the notes icon), etc.

Figure 16:
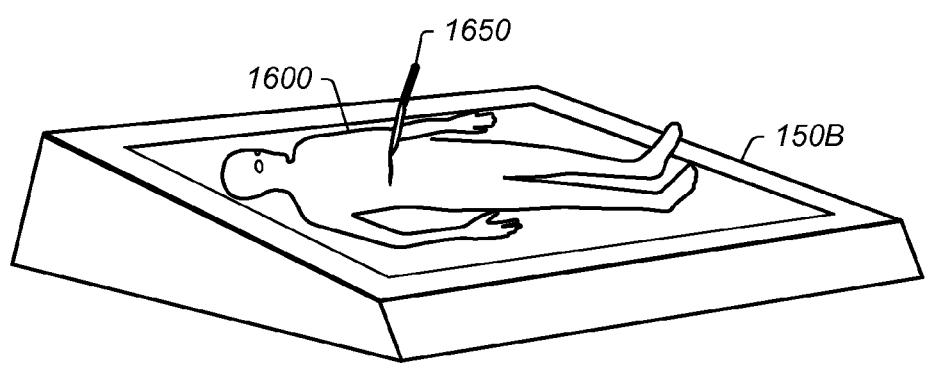

FIG. 16 illustrates an embodiment of a scalpel tool 1650 which may be used to cut an object in a 3D scene, such as the body 1600. In this case, the user may be performing a simulation of a surgery involving a patient's stomach. Thus, the scalpel tool 1650 may allow a user to slice open, or cut any object, thus revealing the interior dimension of the object.

Figure 17A:
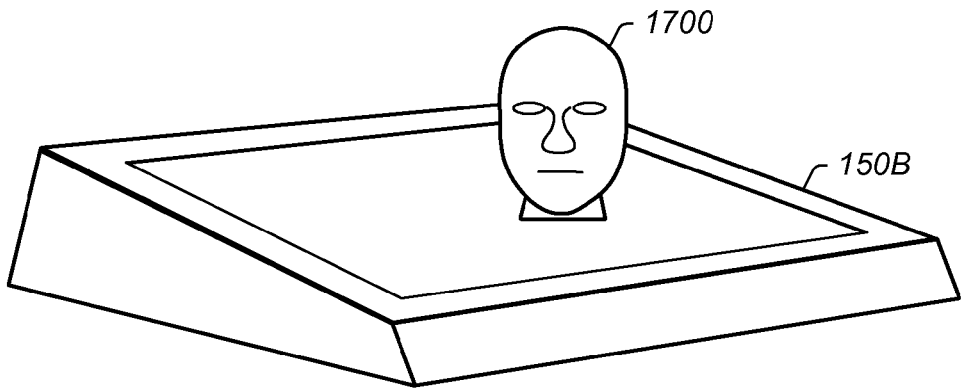
Figure 17B:
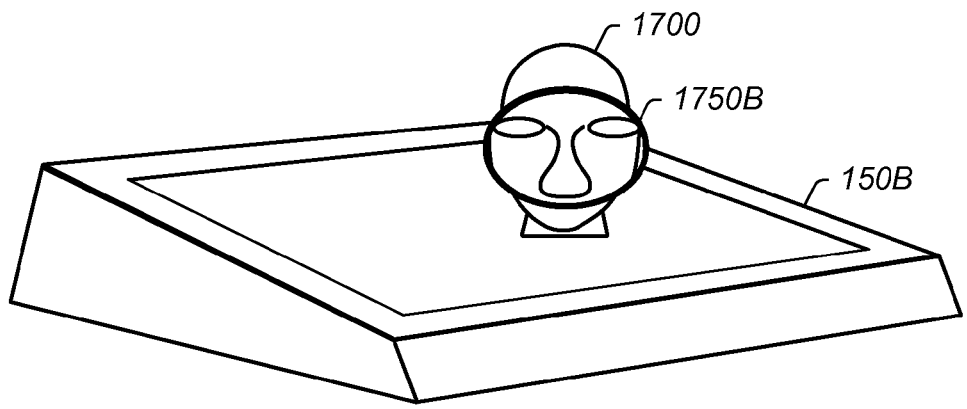
Figure 17C:
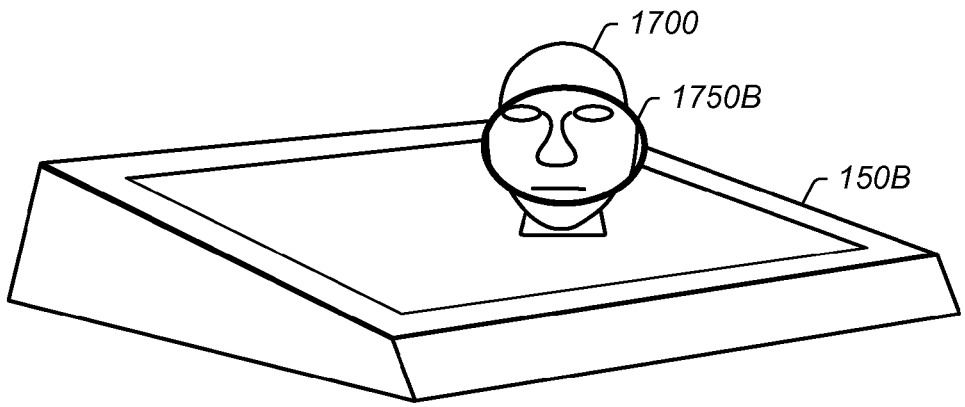

FIGS. 17A-C illustrate an exemplary zoom tool, which may be used to zoom in on an object within the 3D scene. For example, the zoom tool may be used to zoom on the head 1700 of FIG. 17A. The zoom tool may be a multi-function tool, e.g., allowing the user to zoom according to various modes. The zoom tool may have different appearances based on the mode The zoom tool may have a telephoto zoom mode. In this mode, the object or object group or scene in view may appear to move closer to the viewer as zooming occurs. In this mode, objects on the edge of the window (or zooming region) may become out of view as the zooming-in continues. This particular mode may be implemented by narrowing the view frustum within the scene or region of zooming. FIG. 17B illustrates one embodiment of this type of zoom. As shown, within the zooming region 1750A, the portion of the face is shown as closer to the user than the rest of the head 1700.

The zoom tool may operate in a different mode, e.g., a lens zoom mode. In this mode, the object or object group or scene in view expand in size during zooming-in. However, instead of disappearing as in the telephoto zoom mode of FIG. 17B, objects on the edge of the window may still be visible, but may become shrunk or distorted as the zooming-in continues. For example, this zoom mode may be similar to that of a fish-eye lens. This particular mode may be implemented by retaining the same frustum within the scene or region of zooming, but the objects in the center may expand in all three dimensions as the objects in the periphery contract. The transition region demarcating where objects expand versus where objects shrink may variable and may not be linear. FIG. 17C illustrates one embodiment of this type of zoom. As shown, within the zooming region 1750B, the portion of the face is shown as closer to the user than the rest of the head 1700, but the entirety of the zooming region is still present while zoomed.

In an additional mode, the zoom tool may increase the interocular distance for the user, which may provide a zoom-like experience for the user. Note that while FIGS. 17B and 17C show the zooming region within the 3D scene, it may be shown on another display, e.g., monoscopically or stereoscopically, as desired. For example, the zooming described above may be implemented within or as a view of the 3D scene as described in U.S. patent application Ser. No. 12/797,958, which was incorporated by reference in its entirety above. For example, the zoom region of the object(s) may be displayed as the view of the 3D scene in the embodiments described in the incorporated patent application.

Figure 18:
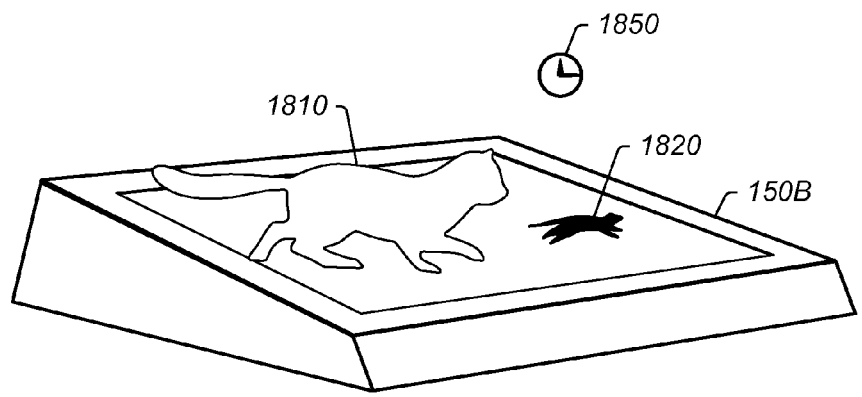

FIG. 18 illustrates one embodiment of a timing tool 1850, which may be used to interact with a 3D scene. For example, the timing tool 1850 may be used to show an animated object or object groups at different speeds (e.g., different animation rates). Further, the timing tool may be used to show object(s) in reverse time. The timing tool may also be used to see a plurality of different objects in the 3D scene at different speeds concurrently, e.g., where a first object is moving at a first animation rate and a second object is moving a second animation rate. In the exemplary embodiment of FIG. 18, the user may use timing tool 1850 to select an object (e.g., the cat 1810 or mouse 1820) and specify a timing rate for the object. The 3D scene may then be updated such that that object moves at the specified timing rate. The rate may be specified via any number of mechanisms, e.g., using a keyboard to fill out a pop-up timing menu, according to a gesture, such as the speed at which the user uses the timing tool 1850, etc. According to various embodiments, the newly specified animation may be shown within the 3D scene, in a different view within the 3D scene, on a different display, etc. For example, where different rates are shown concurrently, each object may be shown at the different rate in parallel windows.

In further embodiments, the specification of timing rates may be combined with other tools, thereby creating a tool that modifies a first property and timing for one or more objects (or the entire scene). For example, a zoom tool may be modified or combined with the timing tool to specify timing according to the zoom function. In one specific embodiment, as the user zooms in on an object (e.g., the cat 1810 or the mouse 1820), the timing for that object may increase or decrease, e.g., corresponding to the amount or type of the specified zoom. The user may be able to specify the relationship between the first function (e.g., the zoom) and the timing, or it may be fixed, according to various embodiments. Alternatively, instead of having a fixed ratio (e.g., linear or non-linear), the user may simply specify the timing rate, e.g., in response to a query from the computer system. Thus, the user may be able to apply different (zoom) scales and speeds (e.g., different time frames, time accelerators/decelerators, etc.) in any environment, or with respect to any object, group or objects, or scene.

The timing embodiments described above may be implemented within or as a view of the 3D scene as described in U.S. patent application Ser. No. 12/797,958, which was incorporated by reference in its entirety above. For example, the object(s) with the specified timing (or the zoomed objects with the specified timings) may be displayed as the view of the 3D scene in the embodiments described in the incorporated patent application.

The timing tool 1850 may use various methods to select one or more objects in the 3D scene. For example, the user may select three points within the 3D scene to specify a cube (or sphere), or the user may use the tool 1850 to draw such a cube or sphere, such that all objects falling within the cube (or sphere) operate at the different rate. In another example, the user may, using a stylus, place a loupe tool over an object and the loupe tool may be designated with a 2× time function. As the tool is maneuvered over an object, any time function associated with the object would be increased two X time.

Figure 19A:
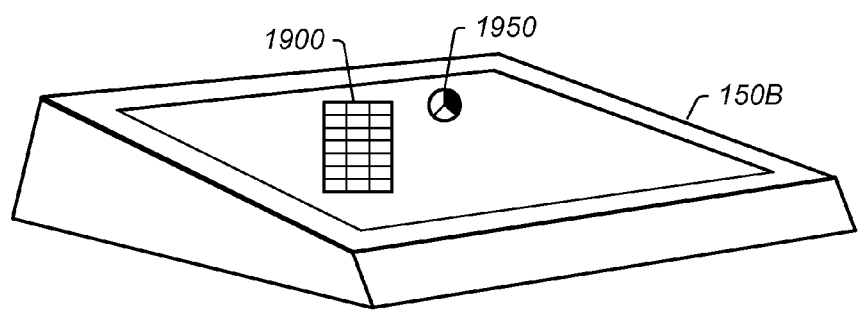
Figure 19B:
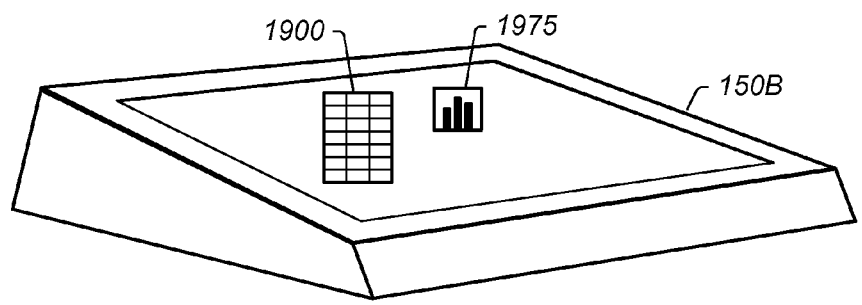

FIGS. 19A and 19B illustrate one embodiment of a graphing tool 1950. The graphing tool 1950 may be used to present graphs based on data displayed within the 3D scene. For example, as shown in FIG. 19A, a spreadsheet 1900 may be presented to the user. The user may position graphing tool 1950 proximate to the spreadsheet 1900 as shown in FIG. 19A, and accordingly, in FIG. 19B, a graph of the data 1975 may be shown (in this case, a bar graph). The graph may have a corresponding number of bars or points with the numbers of columns or data entries (respectively) in the data shown in the 3D scene. Various types of graphs are envisioned (e.g., bar graphs, line graphs, pie charts, etc.), and may be selected automatically or based on user input, as desired. The graph may be updated in real time, e.g., as the numbers in the 3D scene are updated, the graph may be automatically updated. Thus, in one embodiment, a graphing tool may be used to visualize data (e.g., tables of numbers) provided in a 3D scene. The user may also provide input to the graphing tool 1950 (e.g., to the stylus) to change the scale of the displayed graph and/or the type of displayed graph. In another example, multiple graphing tools may be present, each with their own graphing characteristics, which may be used for the same or different tables. The graphing characteristics may be for a certain type of data that may or may not be present in a particular table.

Figure 20A:
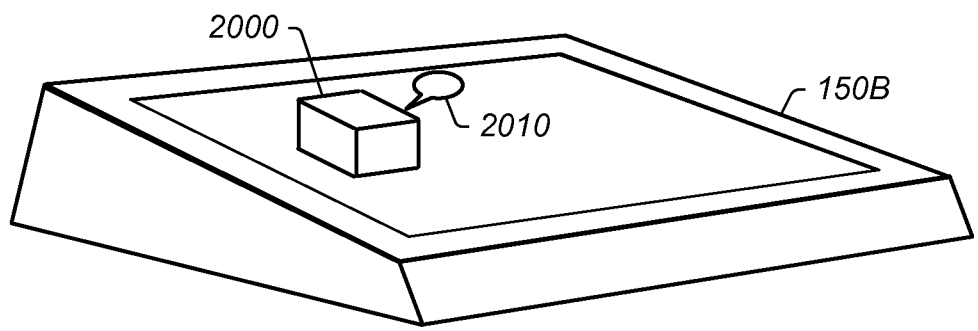
Figure 20B:
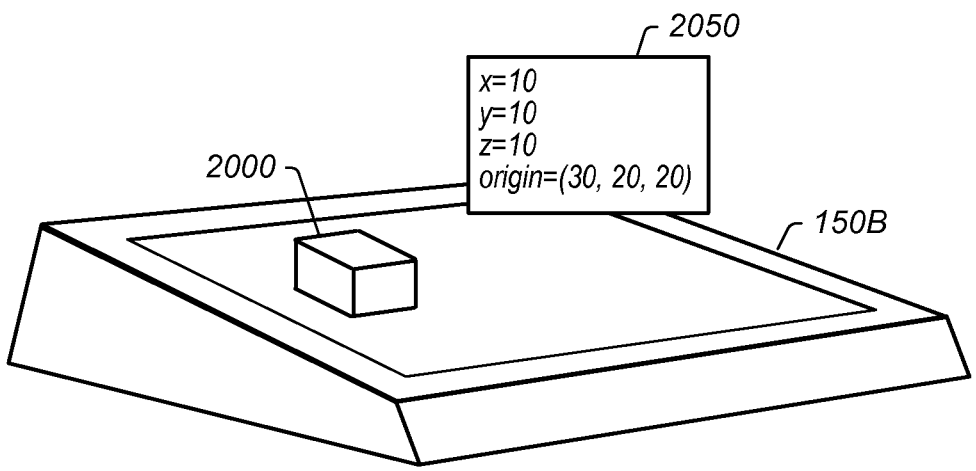

FIGS. 20A and 20B illustrate one embodiment of a method for viewing information associated with an object. As shown in FIG. 20A, an object 2000 (shown as a cube) may be presented in the 3D scene. There may be an indication of information 2010, which may indicate that further information may be viewed that is associated with the object 2000. The information may be any of various types, e.g., notes associated with the object 2000, meta-data of the object 2000, or underlying code of the object 2000. As shown in FIG. 20B, when the user selects or "hovers over" the indication 2010 (or, in some embodiments, the object 2000), the information may be displayed. In this particular instance, the information may be the dimensions of the cube as well as its origin. In the case where the information is the underlying code of the object 2000, the input may cause further underlying code to be viewed, such as the class inheritance of the object 2000, the class that defines the object 2000, variable data associated with the object 2000 (color, transparency, texturing, etc.). In further embodiments, an indication of the information 2010 may not be necessary and the user may view the underlying code (or other information) by selecting the object 2000, e.g., using a code tool or possibly after providing further input to view the underlying code, e.g., via a pop menu or other user interface element.

Figure 21:
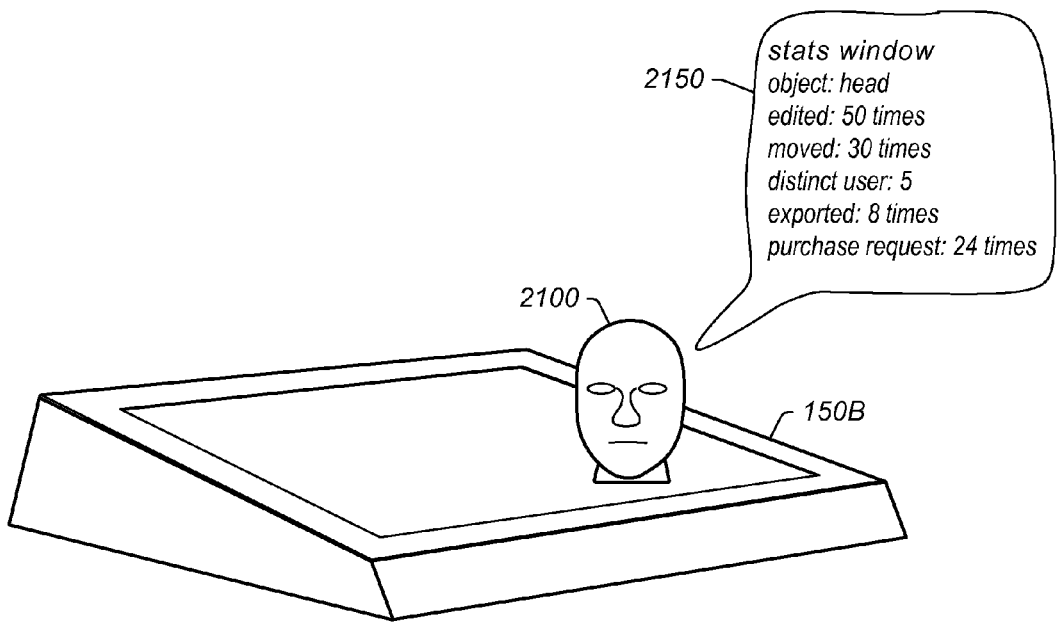

FIG. 21 illustrates another embodiment of information that may be displayed for an object. In this embodiment, statistics or history information 2150 of the head 2100 may be displayed (e.g., when the user is using a stat tool). More particularly, the "stats window" may indicate the object is a head, has been edited 50 times, moved 30 times, been modified or interacted with by 5 distinct users, been exported 8 times, and been requested for purchase 24 times. Thus, FIG. 21 illustrates an embodiment where historical information of an object may be provided, e.g., in response to selection of various kinds.

Figure 22:
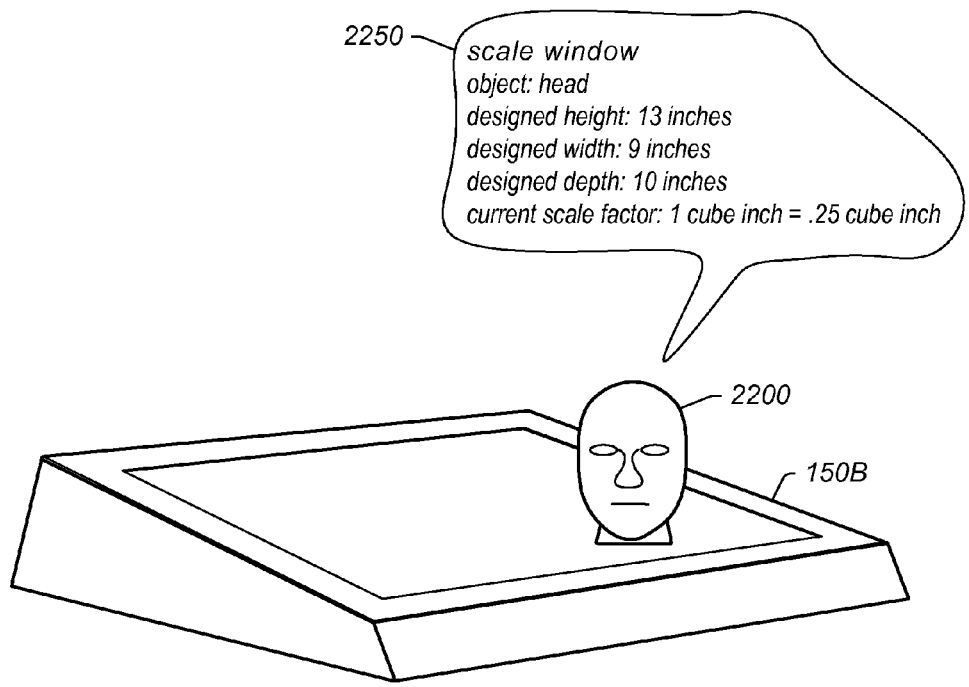

FIG. 22 illustrates another embodiment of information that may be displayed for an object. In this embodiment, scaling information 2250 of the head 2200 may be displayed. More particularly, the "scale window" may indicate the object is a head, its designed height was 13 inches, its designed width was 9 inches, its designed depth is 10 inches, and its currently scale factor is 1 cubic inch=0.25 cubic inches. Thus, in this embodiment, the user may hold a scaling tool over any object and see what size scale at which the object is currently being shown. As another example, a 6 foot tall avatar standing within the screen display at a viewed height of 6 inches would be at 1 inch=1 foot, hence the object would be revealed to be at 6 feet. The scaling tool may also be used to modify the scale, e.g., allowing the user to see any object group at any scale size. The revealed object(s) may either viewed with scaled metadata information or may be selected to temporally be altered to a non-scaled view (e.g., following the above example, the viewed 6 inch Avatar would temporarily be actually viewed at 6 feet tall).

Figure 23A:
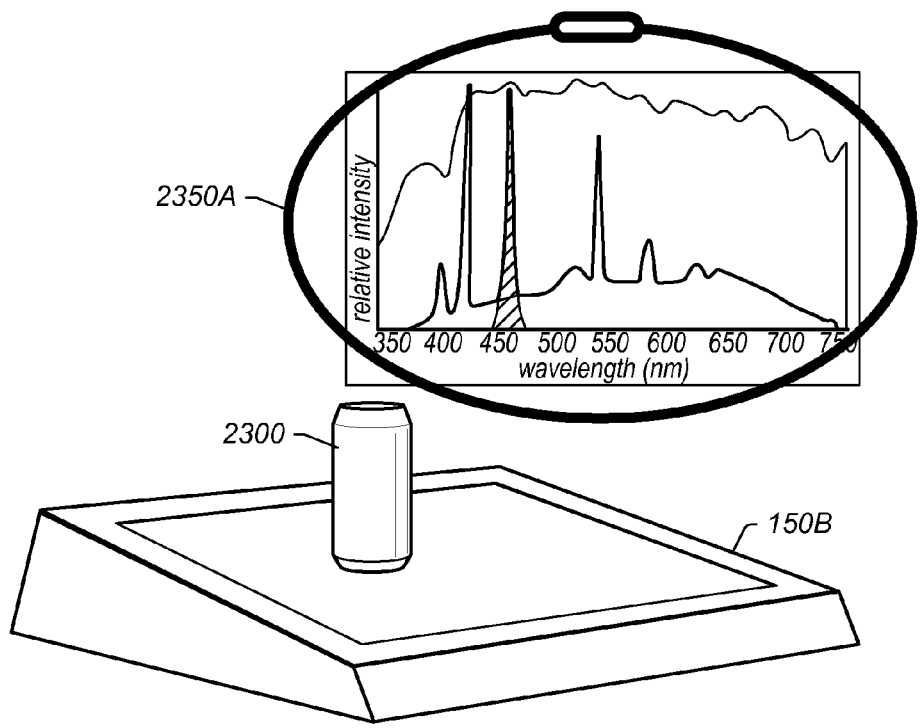
Figure 23B:
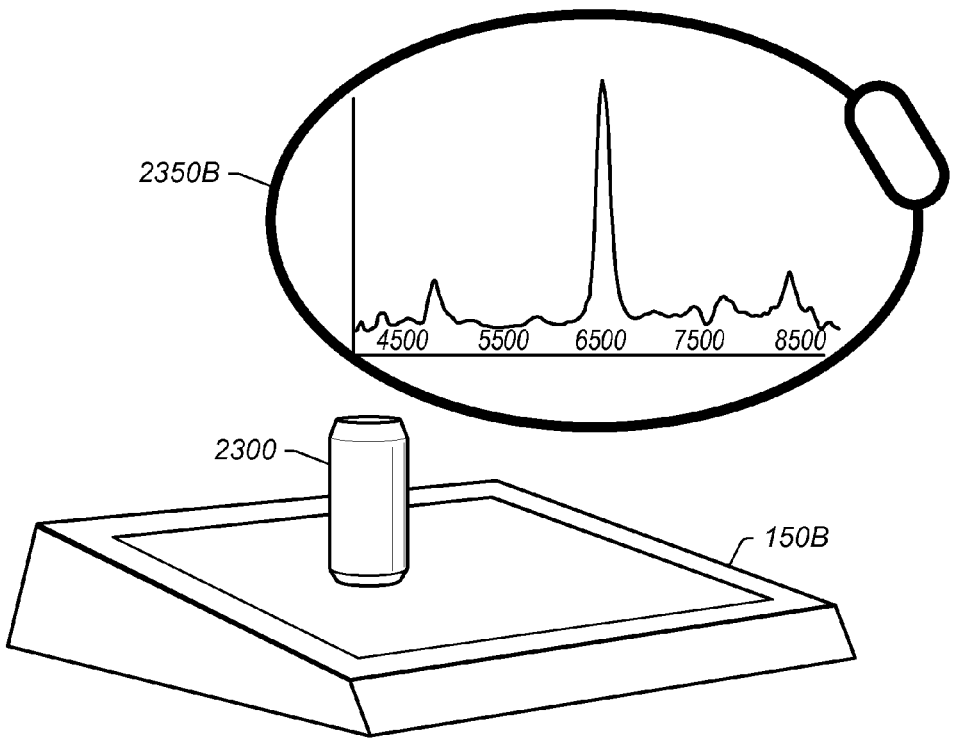

FIGS. 23A and 23B illustrate another embodiment of information that may displayed for an object. In this embodiment, spectral information 2350 of the can 2300 may be displayed, e.g., in response to the user selecting the can 2300 using a spectral tool. More particularly, the spectral information may show relative intensity at various wavelengths, e.g., to view IR data, UV data, visible spectral data, etc. The user may be able to select which type of spectral data should be displayed, and more than one type may be displayed concurrently, as desired. For example, the user may view visible spectral information 2350A in 23A and IR spectral information 2350B in 23B. The different graphs may be indicated by regions 2360A and 2360B, as shown. Thus, spectral information may be displayed for one or more objects in a 3D scene.

Figure 24:
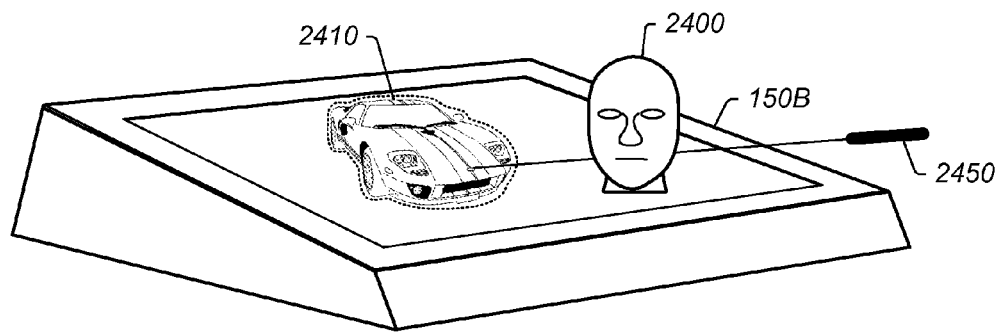
Figure 25A:
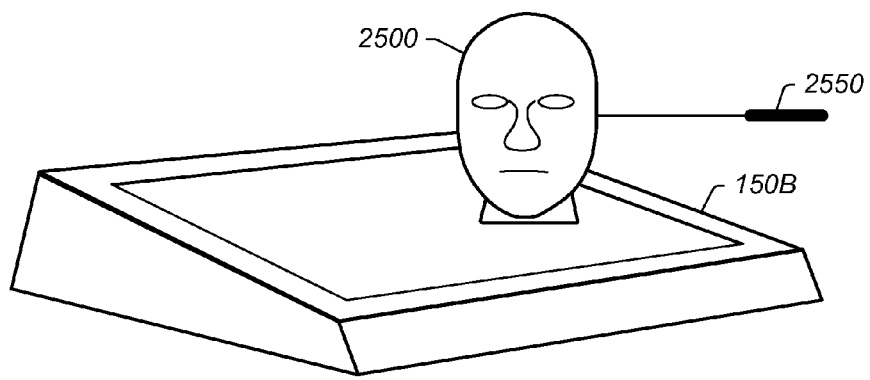
Figure 25B:
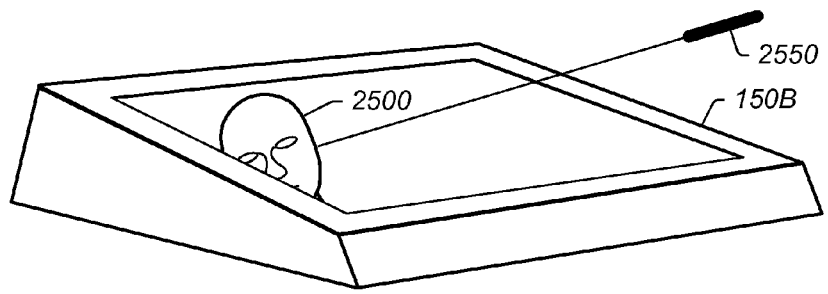

FIGS. 24, 25A, and 25B illustrate embodiments of a variable length laser beam tool. The laser beam tool 2450 operates to present a 3D stereo projected "virtual beam" (referred to as a "laser beam") in the 3D scene which is used to select virtual objects within the 3D scene. In other words, the term "laser beam" refers to a projected image of a beam (or line or similar element) displayed in the 3D scene to select or specify objects within the 3D scene. The laser beam may extend from a physical user input object, such as a stylus or other user input device, or other objects, such as a user's finger. Generally, the laser beam may originate (or have an endpoint) in proximity to the physical user input object. For example, the laser beam may originate within a few micrometers, millimeters, centimeters, etc. of a user's finger or a stylus. In another embodiment, the origination point of the laser beam may be disconnected from the physical user input object (e.g., being more than a few inches from an endpoint of the physical user input object), even though its position can be controlled by the physical user input object. The laser beam may have various properties, such as color, size, thickness, shape, tapering, transparency, length, a default user side end, etc. The laser beam may also have other properties such a stroke where the laser beam length extends and retracts (or vise versa) from an initial length. The stroke could be short or long, as desired. Various ones of these properties may be modified, e.g., manually or automatically, as described below.

As shown in FIG. 24, the user may be able to select two different objects, head 2400 and car 2410 with laser beam tool 2450. In some embodiments, the laser beam tool 2450 may have a length that extends until it reaches an object, beyond an object, or may have a length that is fixed. For example, the length may automatically extend or contract until it intersects an object along its axis, e.g., until it is long enough to reach a closest object in the 3D scene. In cases where the length is fixed, the user may be able to manually adjust that length, e.g., by selecting an extend or retract button on the stylus, among other input possibilities. This may be particularly useful for selecting objects in the 3D scene without forcing the user to move the stylus closer to the object. Thus, in FIG. 24, the user may extend the laser from a length that reaches the head 2400 to a length that reaches the car 2410, e.g., to select or interact with the car 2410.

Further embodiments where the length is automatically modified are envisioned. For example, the length of the laser beam may be based on a localized average distance of objects within the 3D scene. As a specific example, in FIG. 24, the head 2400 may actually comprise separate objects (e.g., ears, nose, two eyes, etc.) and the car 2410 may actually comprise separate objects (e.g., wheels, lights, hood, etc.). Given that there are two groups of objects, the length of the beam may be an average of the proximity to the head objects or the length of the beam may be an average of the proximity to the car objects.

Alternatively, or additionally, the length may be automatically modified based on the distance of the laser beam from the display(s) presenting the 3D scene. For example, the laser beam may always stop at the display surface of the display(s) or a threshold distance away from the display surface(s). Similarly, the laser beam length may be automatically modified based on the distance of a user input device (e.g., a stylus) to the 3D scene and/or the display. For example, the laser beam length may be longer if the user input device is further away from the display, but may become shorter as the user decreases the distance of the user input device to the display. In another embodiment, the length of the laser beam may be automatically determined or modified based on the working volume within the 3D scene. For example, the 3D scene may include a plane, such as a floor, and the laser beam may not extend past that plane. As another example, if the laser beam is used within a working volume or space within an object (e.g., within a room of a house), the length of the beam may be automatically modified so as to scale in length to the working volume. For example, a longer beam may be used for a larger volume and a shorter beam may be used for a smaller volume. As another example, the length of the beam may be automatically modified so as to extend or contract to within a target working space (e.g., to a set of objects within the working space).

FIGS. 25A and 25B illustrate another embodiment where the user may adjust the length of the laser beam tool. In this embodiment, the user may select the head 2500 with the laser beam tool 2550, but may wish to move the head 2500 to a new position, e.g., away from its current position. In this embodiment, instead of moving the stylus with the fixed shorter length, the user may extend the laser beam length, thereby moving the head 2500 to a new position (e.g., since the object is selected by the laser beam tool 2550). In another embodiment, the user may wish to interact with a virtual object within the view volume for a more precise object manipulation. In this case, the laser beam length may be kept short for a more precise control of the laser beam. Thus, in the embodiments of FIGS. 25A and 25B, the user may move selected objects by changing the length of a laser beam.

It should be noted that the virtual laser beam may be associated with a physical device as in a handheld stylus. The projection of the beam may have its near side conveyed in close proximity to the hand held device or may have its near side projection begin near to the handheld device. The movement of the laser beam will be in concert to the movement of the handheld device.

Figure 26A:
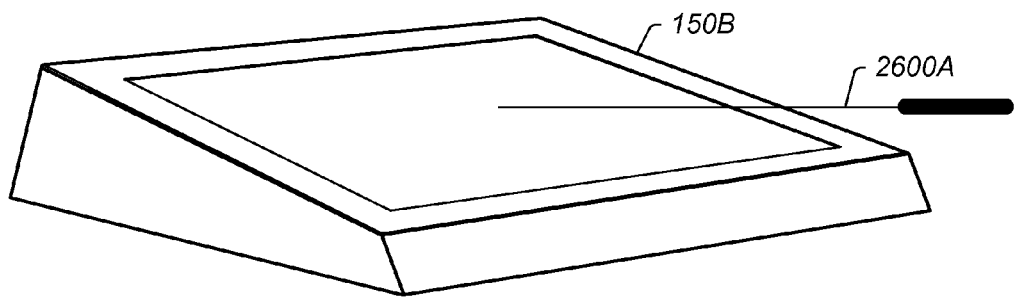
Figure 26B:
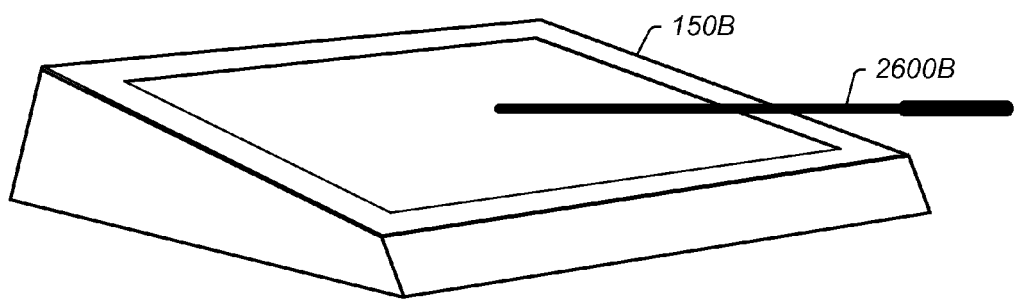

FIGS. 26A and 26B illustrate an embodiment where the visible properties of a laser beam tool 2650 may be adjusted. More particularly, the thickness of the beam in 26A is modified from a thin thickness to a thick thickness in 26B. However, other types of attributes of the laser beam may be modified. For example, the beam color and/or transparency of the beam may be modified, e.g., to improve viewing and pointing experience the beam. For example, a gradient transparency may be applied to the beam, e.g., as it intersects or approaches other objects in the 3D scene. In some embodiments, the attributes of the beam may be modified depending upon the current function of the beam, e.g., automatically. For example, the beam may be automatically modified to be thinner when selected small objects and thicker for selecting larger objects.

As described above, other visible properties may be modified, such as the length of the laser beam, color of the laser beam, shape of the laser beam, whether the beam is tapered, the amount the beam is tapered, etc. In further embodiments, the laser beam may have a visual feature at the end of the laser beam (e.g., a tip) or distinct features along the length of the laser beam. Such visual features may be displayed all the time or may be displayed depending on the context of the laser beam within the 3D scene. For example, a visual feature may be displayed when proximate to an object in the 3D scene, but may not be displayed when it is not proximate to the object in the 3D scene. Thus, the visual feature may be used to visually distinguish, to the user, the end of the laser beam from the objects displayed within the 3D scene. Thus, the "proximity" for this embodiment refers to the distance at which the user may require visual feedback for distinguishing the location of the end of the laser beam when next to an object within the 3D scene. Other embodiments may be used for providing feedback concerning the end of the laser beam to the user or when the beam's end or feature intersects within the volume with a virtual object. For example, audible via 3D stereo audio rendering devices (e.g., via speakers or headphones), visual (e.g., within the 3D scene, such as with the visual feature described above), and/or haptic feedback (e.g., via a physical user input object, such as a stylus or finger) may be provided to the user when the laser beam intersects or is proximate to an object within the 3D scene.

Thus, the visible properties of a laser beam tool 2650 may be modified manually, e.g., via explicit instruction from the user, or automatically, as desired.

In further embodiments, where there are a plurality of visual features along the length of the laser beam, each feature may have a different purpose. For example, a first feature may be used to perform a first action (e.g., grabbing) and a second feature may be used to perform a second action (e.g., cutting), etc. The features may resemble the action for which they are used. Any of the tools described herein may be used for these features, among other possibilities.

Figure 27A:
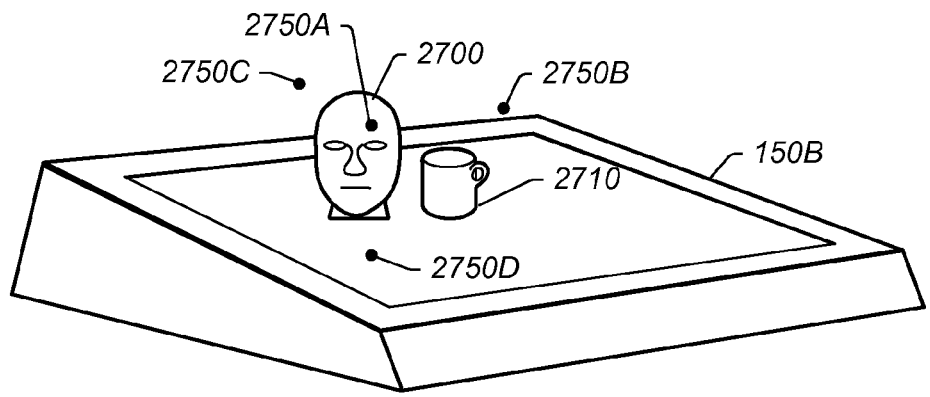
Figure 27B:
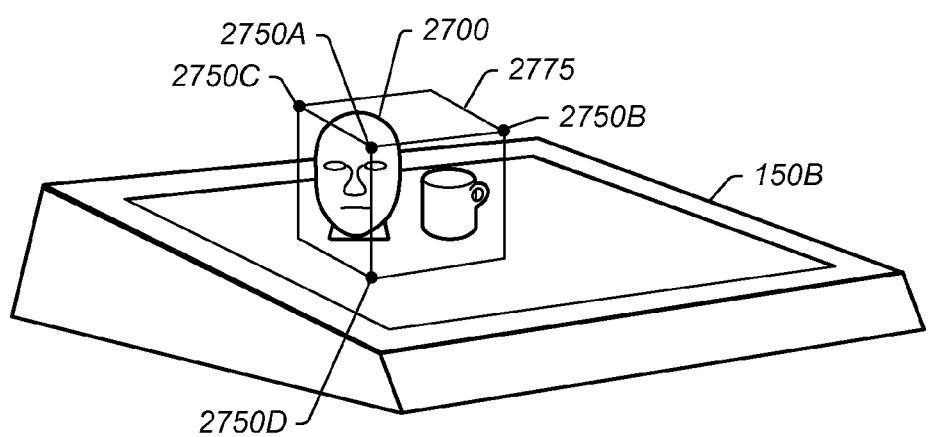

FIGS. 27A and 27B illustrate one embodiment of a method for selecting one or more objects in a 3D scene. As shown, the 3D scene may include head 2700 and cup 2710, and the user may wish to select both of the objects. This selection may be achieved via a variety of methods. For example, the user may select the head 2700 and then select the cup 2710 in a manner that retains the original selection of the head 2700 (e.g., by continually holding the selection button, providing a gesture, shift-clicking, etc.). In the particular embodiment of FIGS. 27A and 27B, the user may provide input for encapsulating the desired objects within a volume. As shown in FIG. 27A, the user may provide the minimum points for defining a rectangular prism (or cube or sphere), and upon receiving that input, the two objects may be selected and the volume of the rectangular prism may be defined, e.g., automatically, as shown in FIG. 27B. Alternatively, the user may simply draw the volume, e.g., draw the sides of the rectangular prism. Other volumes or shapes and methods for specifying the volumes are envisioned. For example, the user may simply draw a line from a first point to a second point and a sphere may be generated around the first point with the radius of the sphere being equal to the length of the line. Correspondingly, all objects within that sphere may be selected. Alternatively, the line may be the diameter of the sphere. Other shapes and methods of input are envisioned.

In further embodiments, instead of specifying points of a desired volume, the user may simply select a predefined volume, e.g., a cube, sphere, cone, etc. and utilize that volume as a selection tool. The user may also be able to change the volume size of the selected predefined volume. In one embodiment, any object intersecting the volume may be selected (e.g., during a selection event). Alternatively, any object contained within the volume (or a threshold percent of the object contained within the volume) may be selected.

Figure 28:
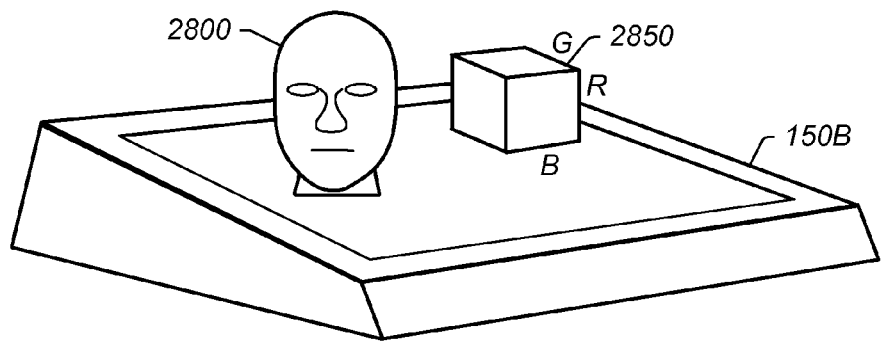

FIG. 28 illustrates one embodiment of a color chooser presented in a 3D scene. As shown, the user may be interacting with head 2800. For example, the user may wish to paint a portion or all of the head 2800 with a desired color. Colors are often defined using a three variable system, such as red, green, blue. In the embodiment shown, a 3D color chooser 2850 may be presented to the user, e.g., in the form of a cube, where each axis corresponds to a variable. In the embodiment shown, the color chooser 2850 may have a first axis for green, a second axis for red, and a third axis for blue. The user may select a color by positioning a point within the cube, thereby specifying all three variables at once. In some embodiments, an indication of the selected color may be indicated, e.g., on the head 2800 or otherwise, as desired. Additionally, predefined colors may be present, e.g., where the user could select "swatches" that act as shortcuts to often-used or well-known colors. In another embodiment, the user may select a value (or use a slider) on each of the three sides of the cube to change the color.

Figure 29A:
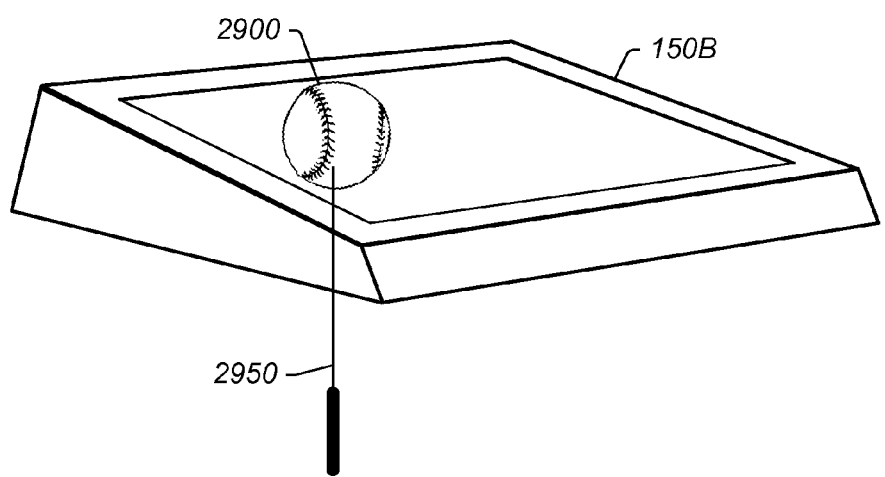
Figure 29B:
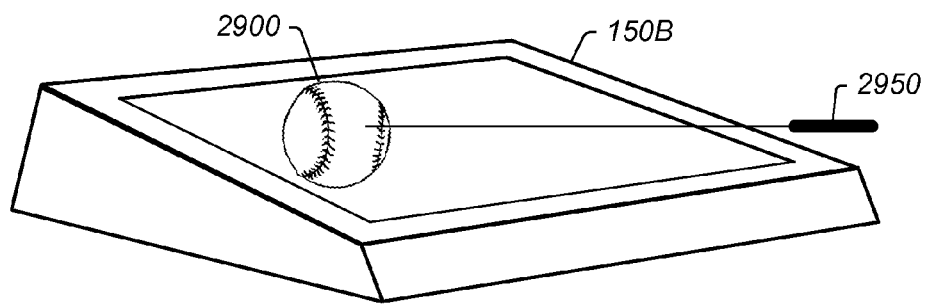

FIGS. 29A and 29B illustrate one embodiment of a method for interacting with a 3D object in a 3D scene. As shown, the scene may include a baseball 2900. The user may initially interact with the baseball 2900 using a laser tool 2950 in the same line of sight as the viewpoint of the user. Accordingly, any modifications (e.g., drawings) on the baseball 2900 may be performed as would normally occur on a 2D screen. However, because this is in a 3D space (presented via a stereoscopic illusion), the user may be able to draw or otherwise manipulate the baseball 2900 at an angle that is different from the viewpoint of the user, e.g., as shown in FIG. 29B. Since the system is able to know where the projected position of the baseball 2900 (e.g., assisted by head tracking) and know the position/orientation of the laser tool 2950 (via the stylus), the user is able to manipulate the baseball 2900 in precisely the same manner that he would have a physical baseball, which has not been previously possible. Thus, the user is able to perform actions on an object without requiring that the line of sight of the viewpoint of the user (and corresponding perspective) is not the same as the line of application of the action (e.g., the line of sight of the laser tool 2950).

In one example, the system may know the projected positioning and orientation of a 3D object, such as a globe, with the American continent facing the user (e.g. longitude 100 degrees), where the user is in front of and facing a vertical display. The user may then place a handheld stylus in his right hand, such that the stylus is placed to the right of the globe and the stylus is pointed to the user's left in a manner that the stylus is also pointing to the core of the globe. If the stylus were actually upon the surface of the globe, the stylus may be touching central Africa (e.g. longitude 10 degrees) on the globe. Thus, from the user's viewpoint, he sees himself touching central Africa (or at least the location that central Africa would be, were he looking at it). If the user now wished to draw a mark on the globe, the user may manipulate the stylus to follow the contour of the globe or along the longitude 10 degree line. Thus, modifications to objects can be performed without requiring rotation of the baseball 2900.

This ability has applications in texture projection, model painting, model deformation, etc. Thus, by moving the stylus around the presented object, the desired direction and orientation of the spatial operation can be achieved as easily as moving an actual paintbrush around an actual object. The use of head-tracking is not required, but, if used, makes the process even more intuitive by allowing the user to naturally look around the 3D model as the spatial operations are applied.

Further Embodiments

In some embodiments, the stylus used for selection may include one or more buttons or may be touch sensitive in order to allow the user to perform various actions, e.g., selecting an object, manipulating that object, etc. In some embodiments, the stylus may have a presented laser extending from the tip of the stylus and into the 3D scene. Where orientation and position of the laser extending from the stylus is determine from the orientation and position of the stylus (as is typically the case), whenever a user presses a button or performs selection using the stylus, the position and orientation of the stylus, and therefore the laser beam, may be inadvertently changed as well (due to the pressing of the button). As a result, the selection or manipulation may be interrupted or not performed in the desired manner. For example, pushing a button on the stylus may move the stylus so that the object that was previously being selected or pointed to is no longer being selected or pointed to. However, the amount that the stylus moves is often the same or within a known threshold of movement and can be therefore be accounted for. Thus, in some embodiments, when a button is depressed, the change in position and orientation of the stylus may either be accounted for or ignored, thereby allowing the laser beam to remain in its initial position before the button selection (or other type of input) occurred. Thus, input filtering regarding the stylus make take place in response to a button selection, touch, or gesture from the user using the stylus. This filtering may allow for a better experience for the user.

In many embodiments, interaction with the 3D scene may involve the use of a stylus or other input mechanisms which utilize the user's hands. Most users have inherent movement or jitter in the hand while specifying a desired object or location within the 3D scene (e.g., when manipulating the stylus). This jitter can be frustrating to the user when interacting with the 3D scene, e.g., using the tools described above. Accordingly, this directional jitter may be reduced or eliminated of a pointing device in a virtual environment. There are two competing considerations for directional smoothing to be effective. One consideration is that the pointing device should remain responsive as the pointer is moved from one position to another. The other requirement is that the pointing device should converge on the desired point when the pointer is intended to be stationary.

In one embodiment, in order to achieve the desired effect, one or more of the six degrees of freedom of the stylus (or other input mechanism/device) may be averaged over time. For example, a static or dynamic length of time may be determined which adjusts for the two considerations above, providing a positive user experience while selecting an object (or otherwise remaining stationary) while still being responsive to user movements. In some embodiments, one or more (e.g., all) of the x, y, and z coordinates may be individually averaged over a period of time to reduce the positional jitter of the cursor. Similarly, one or more (e.g., all) of the yaw, pitch, and roll may be individually or collectively averaged over a period of time to reduce the angular jitter of the cursor. Alternatively, one or more of these degrees of freedom may be averaged together aggregately.

The period of time may be the same for each different degree of freedom or may be different, e.g., in response to dynamic determinations of the period of time for each degree of freedom. In some embodiments, the period of time may be individualized per user (e.g., it may be a smaller period of time for user's who exhibit less jitter, but may be a longer period of time for user's who exhibit more jitter).

In further embodiments, the averaging may be dynamically adjusted or turned on or off. For example, when a threshold amount of acceleration, velocity, and/or change in position is detected, the time averaging may be decreased or turned off (e.g., to become more responsive). Thus, as the user begins a larger movement, the system may recognize that the user is not trying to maintain a stationary cursor, and may therefore decrease or remove time averaging. Conversely, as the user slows down his movement, has a low amount of velocity, or if the change in position is small, the time averaging may be increased or turned on. In some embodiments, instead of a binary "on" or "off", the length of time may increase or decrease in response to the above changes in use, among other factors.

As indicated above, various gestures (e.g., 3D gestures) may be used to specify a user's desired action. In some cases, gestures may be especially desirable over common user input devices, e.g., a gesture overcomes the stylus button selection issues discussed above. Additionally, gestures allow a single input device (e.g., a stylus) to specify a very large number of actions, especially in the case of 3D gestures, due to the many degrees of freedom allowed in a 3D space. Accelerometer recognition (e.g., from an accelerometer on a stylus) may provide some help for gestures in detecting a change in direction and velocity. In addition, some optically based stylus movement tracking may contribute to gesture identification.

Gestures may be defined or recognized via a variety of methods. For example, gestures utilizing a stylus may involve virtually any combination of movement (or lack of movement) along x, y, and/or z coordinates, acceleration, change in yaw, pitch, and roll. Gestures may also involve movement of the user's head, hands, body, etc. Gestures may involve the combination of multiple input devices, e.g., voice recognition and stylus, use of a touch pad and stylus, keyboard and hand gestures, two hands, etc.

The following provides a few examples of useful gestures that may be used in a 3D scene:

Hover—tool or cursor hovers at the same place in a 3D scene for a certain period of time. Such a gesture may result in any of various results. For example, this gesture may enter or exit a gesture mode, bring up a menu on an object, display information related to an object, etc.

Sweep—user accelerates a pointer or cursor at least a predefined distance with a certain acceleration. Such a gesture may result in deletion of objects, setting a user interface element (such as a slider) to maximum value, etc.

Slide—user moves a pointer or cursor a minimal distance with acceleration greater than a threshold, e.g., and then decelerates to a stop. Such a gesture may result in movement of an object (e.g. along an axis), rotation, etc.

Rotation—user rotates the stylus along its own axis (within a tolerance), e.g., with an angular acceleration greater than a predefined value and possibly with change of the other two Euler angles within a given tolerance range. The gesture may be continuously read while the rotation angle is greater than the predefined value and may end when the angle is less than the predefined value. Such a gesture may result in turning on or off context menus, rotation menus, etc., e.g., based on the directionality of the rotation (clockwise or counterclockwise).

Although the embodiments above have been described in considerable detail, numerous variations and modifications will become apparent to those skilled in the art once the above disclosure is fully appreciated. It is intended that the following claims be interpreted to embrace all such variations and modifications.

I claim:

1. A method for utilizing user interface elements in a three dimensional (3D) scene, comprising:
    presenting the 3D scene by at least one display, wherein said presenting the 3D scene comprises displaying at least one stereoscopic image of the 3D scene by the at least one display, wherein the 3D scene is presented according to a first viewpoint, wherein the 3D scene includes a laser beam of a laser beam tool;
    receiving user input specifying a change in visible properties of the laser beam, including a change in laser beam length of the laser beam tool; and
    automatically updating the 3D scene based on the user input, wherein said automatically updating comprises modifying visible properties of the laser beam of the laser beam tool, including changing the laser beam length in the 3D scene based on a distance of a working volume of the 3D scene.

2. A non-transitory computer accessible memory medium storing program instructions for utilizing user interface elements in a three dimensional (3D) scene, wherein the program instructions are executable by a processor to:
    present the 3D scene by at least one display, wherein said presenting the 3D scene comprises displaying at least one stereoscopic image of the 3D scene by the at least one display, wherein the 3D scene is presented according to a first viewpoint, wherein the 3D scene includes a laser beam of a laser beam tool, wherein during said presenting the 3D scene the laser beam has a first visible length;
    receive user input specifying a change in position of the laser beam tool; and
    present an updated 3D scene based on the user input, wherein during said presenting the updated 3D scene, the laser beam has a second visible length, wherein the change in length of the laser beam from the first visible length to the second visible length is based on a distance of a working volume of the 3D scene.

3. The non-transitory computer accessible memory medium of claim 1, wherein the change in length of the laser beam from the first visible length to the second visible length is performed automatically.

4. The non-transitory computer accessible memory medium of claim 2, wherein the change in length of the laser beam from the first visible length to the second visible length is further based on a closest object to the laser beam within the working volume.

5. The non-transitory computer accessible memory medium of claim 2, wherein the change in length of the laser beam from the first visible length to the second visible length is further based on an average distance of objects within the 3D scene.

6. The non-transitory computer accessible memory medium of claim 2, wherein the program instructions are further executable to:
    provide feedback when an end of the laser beam intersects an object in the 3D scene.

7. The non-transitory computer accessible memory medium of claim 6, wherein to provide feedback when an end of the laser beam intersects an object in the 3D scene, the program instructions are executable to:
provide feedback when an end of the laser beam intersects an object in the 3D scene within the working volume in the 3D scene.

8. The non-transitory computer accessible memory medium of claim 7, wherein the feedback comprises one or more of:
audible feedback;
visual feedback; or
haptic feedback.

9. The non-transitory computer accessible memory medium of claim 7, wherein the feedback comprises a visual feature at the end of the laser beam.

10. The non-transitory computer accessible memory medium of claim 2, wherein the user input is received via a physical user input object, wherein the change in length of the laser beam from the first visible length to the second visible length is further based on a change in position of the physical user input object, and wherein the laser beam originates in proximity to the physical user input object.

11. The non-transitory computer accessible memory medium of claim 2, wherein said automatically updating comprises a tapering of the laser beam.

12. The non-transitory computer accessible memory medium of claim 2, wherein said automatically updating comprises changing a color of the laser beam.

13. A system for utilizing tools in a three dimensional (3D) scene, comprising:
a processor;
an input device configured to provide information to the processor indicating a current viewpoint of the user;
at least one display coupled to the processor;
a memory medium coupled to the processor which stores program instructions executable to:
present the 3D scene by at least one display, wherein said presenting the 3D scene comprises displaying at least one stereoscopic image of the 3D scene by the at least one display, wherein the 3D scene is presented according to the current viewpoint of the user, wherein the 3D scene includes a laser beam of a laser beam tool;
receive user input specifying a change in visible properties of the laser beam of the laser beam tool, including a change in laser beam length of the laser beam tool; and
automatically update the 3D scene based on the user input, wherein said automatically updating comprises modifying visible properties of the laser beam of the laser beam tool, including changing the laser beam length in the 3D scene based on a distance of a working volume of the 3D scene.

14. The system of claim 13, wherein said automatically updating comprises applying a gradient transparency to the laser beam.

15. The system of claim 13, wherein the program instructions are further executable to:
provide feedback when an end of the laser beam intersects an object in the 3D scene.

16. The system of claim 15, wherein to provide feedback when an end of the laser beam intersects an object in the 3D scene, the program instructions are executable to:
provide feedback when an end of the laser beam intersects an object in the 3D scene within the working volume in the 3D scene.

17. The system of claim 16, wherein the feedback comprises one or more of:
audible feedback;
visual feedback; or
haptic feedback.

18. The system of claim 15, wherein the feedback comprises a visual feature at the end of the laser beam.

19. The system of claim 13, wherein the change in length of the laser beam from the first visible length to the second visible length is further based on a closest object to the laser beam within the working volume of the 3D scene.

20. The system of claim 13, wherein the user input is received via a physical user input object, and wherein the change in length of the laser beam from the first visible length to the second visible length is further based on a change in position of the physical user input object.

21. The system of claim 13, wherein said automatically updating comprises a tapering of the laser beam.

22. The system of claim 13, wherein said automatically updating comprises changing a color of the laser beam.

23. The system of claim 13, wherein the program instructions are further executable to:
receive user input specifying a position of the laser beam tool, wherein the user input is received via a physical user input object, and wherein the laser beam originates in proximity to the physical user input object.

24. A non-transitory computer accessible memory medium storing program instructions for utilizing user interface elements in a three dimensional (3D) scene, wherein the program instructions are executable by a processor to:
present the 3D scene by at least one display, wherein said presenting the 3D scene comprises displaying at least one stereoscopic image of the 3D scene by the at least one display, wherein the 3D scene is presented according to a first viewpoint, wherein the 3D scene includes a laser beam of a laser beam tool, wherein during said presenting the 3D scene the laser beam has a first visible length;
receive user input specifying a change in position of the laser beam tool; and
present an updated 3D scene based on the user input, wherein during said presenting the updated 3D scene, the laser beam has a second visible length, wherein the change in length of the laser beam from the first visible length to the second visible length is based on an average distance of objects within the 3D scene.

* * * * *